United States Patent
Pearlman et al.

(10) Patent No.: US 6,674,911 B1
(45) Date of Patent: *Jan. 6, 2004

(54) N-DIMENSIONAL DATA COMPRESSION USING SET PARTITIONING IN HIERARCHICAL TREES

(76) Inventors: William A. Pearlman, 851 Maxwell Dr., Niskayuna, NY (US) 12309; Amir Said, 20380 Stevens Creek Blvd., Apt. 208, Cupertino, CA (US) 95014

( * ) Notice: Subject to any disclaimer, the term of this patent is extended or adjusted under 35 U.S.C. 154(b) by 0 days.

This patent is subject to a terminal disclaimer.

(21) Appl. No.: 10/253,521

(22) Filed: Sep. 25, 2002

Related U.S. Application Data

(63) Continuation-in-part of application No. 09/093,076, filed on Jun. 8, 1998, now abandoned, which is a continuation of application No. 08/527,863, filed on Sep. 14, 1995, now Pat. No. 5,764,807.

(51) Int. Cl.[7] .............................. G06K 9/36; G06K 9/46
(52) U.S. Cl. ................... 382/240; 375/240.19
(58) Field of Search ................ 382/128, 232, 382/240, 248; 375/240.18, 240.19; 341/79; 348/395.1, 397.1, 398.1, 408.1, 437.1, 438.1

(56) References Cited

U.S. PATENT DOCUMENTS

| | | | | | |
|---|---|---|---|---|---|
| 5,490,233 A | * | 2/1996 | Kovacevic | ................. | 704/230 |
| 5,495,292 A | * | 2/1996 | Zhang et al. | .......... | 375/240.02 |
| 5,563,960 A | * | 10/1996 | Shapiro | ...................... | 382/239 |
| 5,602,589 A | * | 2/1997 | Vishwanath et al. | ... | 375/240.11 |
| 5,764,807 A | * | 6/1998 | Pearlman et al. | .......... | 382/240 |

OTHER PUBLICATIONS

Said et al., "Image Compression Using the Spatial–Orientation Tree", May 1993, pp. 279–282.*
Said et al., "A New, Fast, and Efficient Image Codec Based on Set Partitioning in Hierarchial Trees", IEEE Transactions on Circuits and Systems for Video Technology, Vol. 6, No. 3, Jun. 1996; pp. 243–250.*

* cited by examiner

Primary Examiner—Timothy M. Johnson
(74) Attorney, Agent, or Firm—Robert Westerlund; Raymond Powell

(57) ABSTRACT

A data structure in a computer memory for use in encoding and decoding an N-dimensional subband decomposition of data points includes, after initialization, three lists: a list of insignificant sets of points (LIS); a list of significant points (LSP); and a list of insignificant points (LIP). The LIS is populated with sets, each of the sets being designated by a root node within the N-dimensional subband decomposition and having a corresponding tree structure of points within the N-dimensional subband decomposition, which tree structure of points is organized as descendants and offspring of the root node but not including the root node, the LIP is populated with points from within the highest designated subband of the N-dimensional subband decomposition, while the LSP is initially empty. The data structure permits encoding and decoding of any N-dimensional data set, i.e., any data set where N is a positive integer. Method and software for employing this data structure are also described.

39 Claims, 23 Drawing Sheets

Bit-stream of separate color coding

L color component (Y) only available at this point

Embedded color bit-stream

Y, U, and V all available at this point

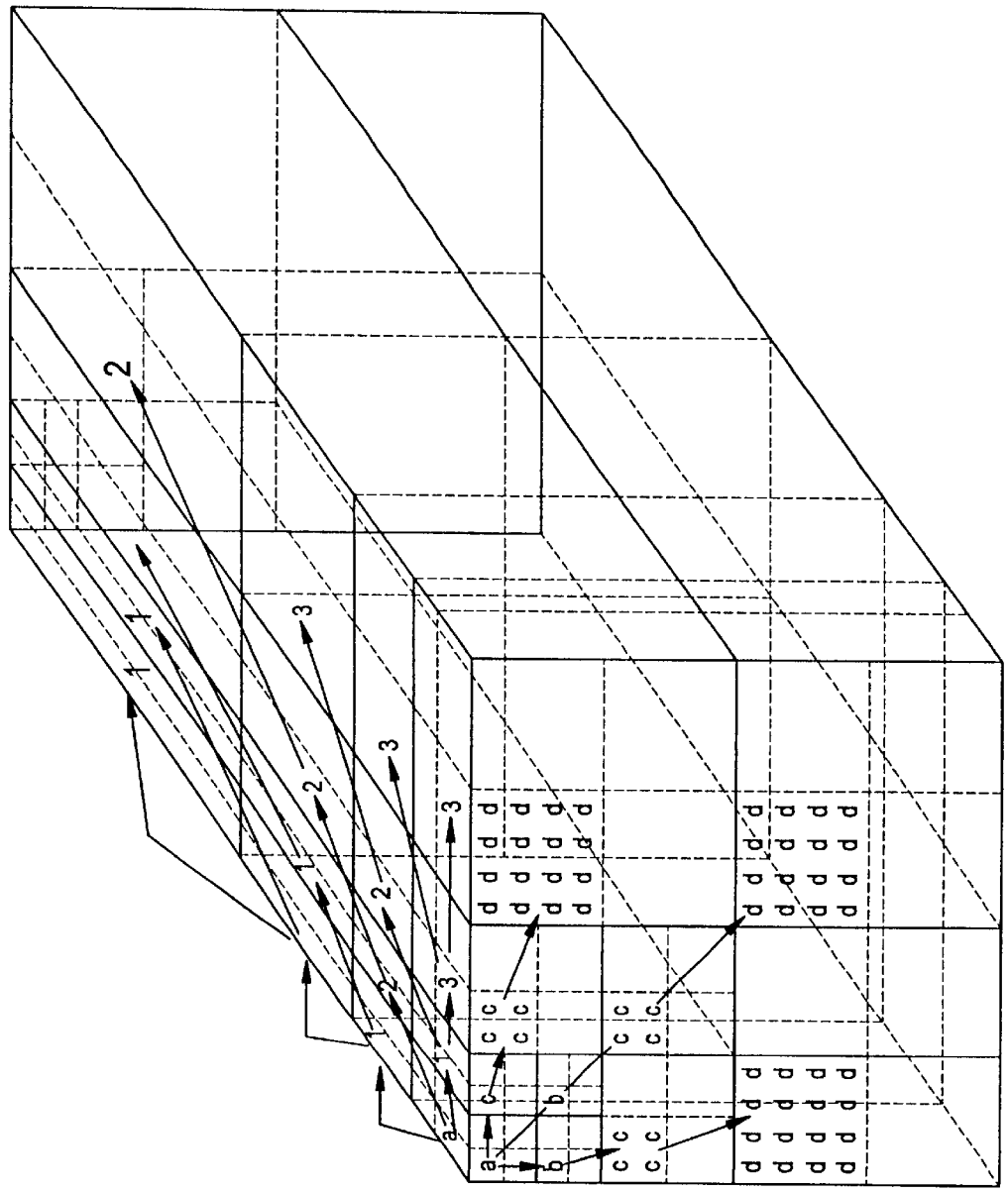

ERC-SPIHT

STTP-SPIHT

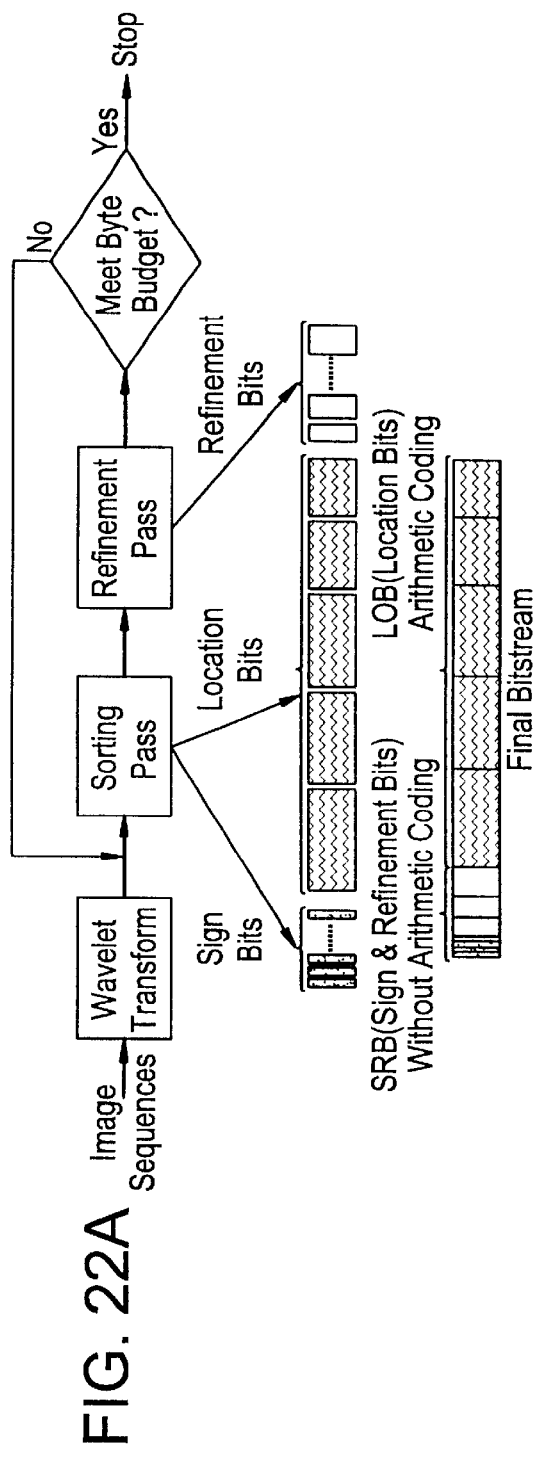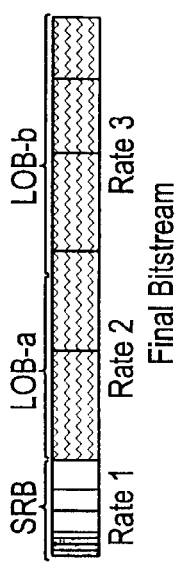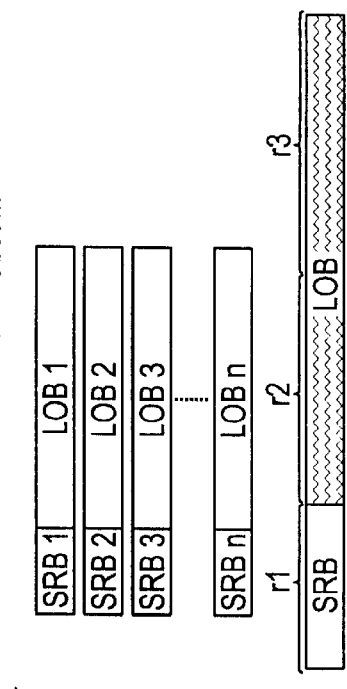
FIG. 22A
FIG. 22B
FIG. 22C

N-DIMENSIONAL DATA COMPRESSION USING SET PARTITIONING IN HIERARCHICAL TREES

This is continuation-in-part of U.S. application Ser. No. 09/093,076, which was filed on Jun. 8, 1998, now abandoned, which in turn is a continuation of U.S. application Ser. No. 08/527,863 (now U.S. Pat. No. 5,764,807), which was filed on Sep. 14, 1995.

BACKGROUND OF THE INVENTION

The present invention relates in general to data compression techniques. More specifically, the present invention relates to a compressed data stream generated in accordance with data compression technique using hierarchical subband decomposition of a data set and set partitioning of data points within the hierarchical subband decomposition using hierarchical trees. Moreover, the present invention relates to a data structure facilitating decoding and encoding of a subband decomposition of data points and compressed data containing that data structure. In particular, the present invention relates to N-dimensional data compression and recovery using set partitioning in hierarchical trees.

As the amount of information processed electronically increases, the requirement for o information storage and transmission increases as well. Certain categories of digitally processed information involve large amounts of data, which translates into large memory requirements for storage and large bandwidth requirements for transmission. Accordingly, such storage and/or transmission can become expensive in terms of system resource utilization, which directly translates into economic expense. It will be appreciated that the digitally processed information can be one dimensional (1-D) information, e.g., audio data, two dimensional (2-D) information, e.g., image data, or three dimensional (3-D) information, e.g., video data. These examples are illustrative, rather than limiting.

With respect to 2-D data, many data compression techniques have been employed to decrease the amount of data required to represent certain digitized information. For example, compression techniques have been applied to the data associated with a bit-mapped image. One prior data compression technique devoted to image data is the ISO/JPEG (International Standards Organization/Joint Photographic Experts Group) data compression standard. Although the ISO/JPEG technique has been adopted as an industry standard, its performance is not optimal.

Recently, techniques using hierarchical subband decomposition, also known as wavelet transforms, have emerged. These techniques achieve a hierarchical multi-scale representation of a source image. For example, subband decomposition of video'signals, i.e., 3-D information, is disclosed in U.S. Pat. No. 5,223,926 to Stone et al. and U.S. Pat. No. 5,231,487 to Hurley et al., each of which is incorporated herein by reference in its entirety. However, once subband decomposition of a source image has been performed, the succeeding techniques of coding the resultant data for transmission and/or storage have yet to be fully optimized. Specifically, for example, both the computational efficiency and coding efficiency of the prior techniques may be further improved. One prior technique has been disclosed by A. Said and W. Pearlman in "Image Compression Using the Spatial-Orientation Tree." IEEE Int. Symp. on Circuits and Systems, Vol. 1, pp.279–282, May 1993, which is also incorporated herein by reference in its entirety.

With respect to 3-D data, the demand for video for transmission and delivery across both high and low bandwidth channels has accelerated. The high bandwidth applications include digital video by satellite (DVS) and high-definition television (HDTV), both based on MPEG-2 compression technology. The low bandwidth applications are dominated by transmission over the Internet, where most modems transmit at speeds below 64 kilobits per second (Kbps). Under these stringent conditions, delivering compressed video at an acceptable quality level becomes a challenging task, since the required compression ratios are quite high. Nonetheless, the current test model standards of H.263 and H.263+ do a creditable job in providing video of acceptable quality for certain applications at high bit rates sought by ISO's MPEG-4, which also seeks low bit rates, and ITU's H.26L standards groups, but better schemes with increased functionality are actively being sought by the MPEG-4 and MPEG-7 standards committees.

The current and developing standards of MPEG-2, H.263, H.263+, MPEG-4, and H.26L are all based on block DCT coding of displaced frame differences, where displacements or motion vectors are determined through block-matching estimation methods. Although reasonably effective, these standards lack the inherent functionality now regarded as essential for emerging multimedia applications. In particular, resolution and fidelity (rate) scalability, the capability of progressive transmission by increasing resolution and increasing fidelity, is considered essential for emerging video applications to multimedia. Moreover, if a system is truly progressive by rate or fidelity, then it can presumably handle both the high-rate and low-rate regimes of digital satellite and Internet video, respectively. The current and emerging standards use a hybrid motion-compensated differential discrete cosine transform (DCT) coding loop, which must use a base layer of reasonable fidelity and add layers of increasing fidelity upon it to achieve progressive fidelity. By its very nature, this kind of scheme allows no scalability or progressivity of the base layer and must suffer in accuracy compared to single layer coding at the same bit rate.

Subband coding has been shown to be a very effective coding technique. It can be extended naturally to video sequences due to its simplicity and non-recursive structure that limits error propagation within a certain group of frames (GOF). Three-dimensional (3-D) subband coding schemes have been designed and applied for mainly high or medium bit-rate video coding. Karlsson and Vetterli in their article entitled Three Dimensional Subband Coding of Video (Proc. ICASSP, pages 1100–1103, April 1988.), took the first step toward 3-D subband coding using a simple 2-tap Haar filter for temporal filtering. Podilchuk, Jayant, and Farvardin in the article Three-Dimensional Subband Coding of Video (IEEE Transactions on Image Processing, 4(2):125–139, February 1995), described the use of the same 3-D subband coding (SBC) framework without motion compensation. It employed adaptive differential pulse code modulation (DPCM), and vector quantization to overcome the lack of motion compensation.

Furthermore, Kronander, in his article entitled New Results on 3-Dimensional Motion Compensated Subband Coding (Proc. PCS-90, March 1990), presented motion compensated temporal filtering within the 3-D SBC framework. However, due to the existence of pixels not encountered by the motion trajectory, he needed to encode a residual signal. Based on the previous work, motion compensated 3-D SBC with lattice vector quantization was introduced by Ohm in his article entitled Advanced Packet Video Coding Based on Layered VQ and SBC Techniques (IEEE Transactions on Circuit and System for Video Technology, 3(3):208–221, June 1993). Ohm introduced the idea for a perfect reconstruction filter with the block-matching algorithm, where 16 frames in one GOF are recursively decomposed with 2-tap filters along the motion trajectory. He then refined the idea to better treat the connected/unconnected pixels with arbitrary motion vector field for a perfect reconstruction filter, and extended to arbitrary symmetric (linear phase) QMF's. See Three-Dimensional Subband Coding with Motion Compensation (IEEE Transactions on Image Processing, 3(5):559–571, September 1994). Similar work by Choi and Woods, described in their article Motion-Compensated 3-D Subband Coding of Video (Submitted to IEEE Transactions on Image Processing, 1997), employed a different way of treating the connected/unconnected pixels; this sophisticated hierarchical variable size block matching algorithm has shown better performance than MPEG-2.

Due to the multiresolutional nature of SBC schemes, several scalable 3-D SBC schemes have appeared. Bove and Lippman, in their article entitled Scalable Open-Architecture Television (*SMPTE J.*, pages 2–5, January 1992) proposed multiresolutional video coding with a 3-D subband structure. Taubman and Zakhor introduced a multi-rate video coding system using global motion compensation for camera panning, in which the video sequence was pre-distorted by translating consecutive frames before temporal filtering with 2-tap Haar filters. See D. Taubman, Directionality and Scalability in Image and Video Compression (PhD thesis, University of California, Berkeley, 1994) and D. Taubman et al., Multirate 3-D Subband Coding of Video (IEEE Transactions on Image Processing, 3(5):572–588, September 1994). This approach can be considered as a simplified version of Ohm's technique in that it treats connected/unconnected pixels in a similar way for temporal filtering. However, the algorithm generates a scalable bit-stream in terms of bit-rate, spatial resolution, and frame rate.

Meanwhile, there have been several research activities on embedded video coding systems based on significance tree quantization, which was introduced by Shapiro for still image coding as the embedded zerotree wavelet (EZW) coder in the paper entitled An Embedded Wavelet Hierarchical Image Coder (Proceedings IEEE International Conference on Acoustics, Speech, and Signal Processing (ICASSP), San Francisco, pages IV 657–660, March 1992). It was later improved through a more efficient state description in the paper by A. Said et al. entitled Image Compression Using the Spatial-Orientation Tree (Proc. IEEE Intl. Symp. Circuits and Systems, pages 279–282, May 1993) and called improved EZW or IEZW. This two-dimensional (2-D) embedded zero-tree (IEZW) method has been extended to 3-D IEZW for video coding by Chen and Pearlman, as described in the paper entitled Three-Dimensional Subband Coding of Video Using the Zero-Tree Method (Visual Communications and Image Processing '96, Proc. SPIE 2727, pages 1302–1309, March 1996) and showed promise of an effective and computationally simple video coding system without motion compensation, and obtained excellent numerical and visual results. A 3-D zero-tree coding through modified EZW has also been used with good results in compression of volumetric images, as reported by in the paper by J. Luo et al. entitled Volumetric Medical Image Compression with Three-Dimensional Wavelet Transform and Octave Zerotree Coding (Visual Communications and Image Processing'96, Proc. SPIE 2727, pages 579–590, March 1996). Recently, a highly scalable embedded 3-D SBC system with tri-zerotrees for very low bit-rate environment was reported with coding results visually comparable, but numerically slightly inferior to H.263. See J. Y. Tham et al., Highly Scalable Wavelet-Based Video Codec for Very Low Bit-rate Environment (IEEE Journal on Selected Area in Communications, Vol. 16, pp. 4–27 (January 1998)).

The present invention is directed toward optimizing the coding of a subband decomposition of N-dimensional data for transmission and/or storage. What is needed is a N-dimensional subband coder and corresponding decoder that is both fast and efficient. Moreover, what is needed is a three-dimensional (3-D) subband-based image sequence coder that is fast and efficient. It would be highly desirable to have a 3-D subband-based image sequence coder that possesses the multimedia functionality of resolution and rate scalability.

SUMMARY OF THE INVENTION

Based on the above and foregoing, it can be appreciated that there presently exists a need in the art for coders and corresponding decoders that overcome the above-described deficiencies. The present invention was motivated by a desire to overcome the drawbacks and shortcomings of the presently available technology, and thereby fulfill this need in the art.

One object of the present invention is to provide a more efficient 3-D subband embedded coding system capable of coding image sequences, including video and volume imagery.

Another object of the present invention is to provide a computationally simple 3-D subband embedded image sequence coding system. According to one aspect of the invention, the 3-D subband embedded image sequence coding system has many desirable attributes including:

a. complete embeddedness for progressive fidelity transmission;
b. precise rate control for constant bit-rate (CBR) traffic;
c. low-complexity for possible software-only real time implementation and applications; and
d. multiresolution scalability.

Another object according to the present invention is to produce a 3-D subband coding system that is compact. Advantageously, the 3-D subband coding system, in an exemplary case, is so compact that it consists of only two parts: a 3-D spatio-temporal decomposition device; and a 3-D SPIHT coding device. According to one aspect of the present invention, an input image sequence, e.g., video, is first 3-D wavelet transformed with (or without) motion compensation (MC), and then encoded into an embedded bit-stream by the 3-D SPIHT kernel.

Briefly summarized, in a first aspect, the present invention includes a method for use in encoding and decoding a subband decomposition of an N-dimensional data set, where N is a positive integer. The method comprises creating a list of insignificant sets of points (referred to herein as the list of insignificant sets—"LIS"), wherein each set of the LIS is designated by a root node within the subband decomposition and has a corresponding tree structure of points within the subband decomposition. The tree structure is organized as points comprising descendants and offspring of the root node, wherein a first generation of the descendants comprises the offspring.

The method further includes evaluating the descendants of the root node of each set of the LIS for significance, wherein a significant descendent of the descendants of the root node has a subband coefficient at least equal to a predetermined threshold. For each root node of the LIS having at least one significant descendant, descendants of the offspring of the root node are evaluated for significance, wherein a significant descendant of the offspring of the root node has a coefficient at least equal to the predetermined threshold. If the root node has at least one significant descendant of offspring, then each offspring of the root node is added to the LIS as a root node thereof.

In an exemplary embodiment, the method includes creating a list of significant pixels ("LSP"), the LSP initially comprising an empty set, and creating a list of insignificant pixels ("LIP"), the LIP comprising points from within a highest designated subband, i.e., lowest frequency subband, of the subband decomposition. Furthermore, for each root node of the LIS having at least one significant descendant, the offspring of the root node may be evaluated for significance, wherein a significant offspring has a coefficient at least equal to the predetermined threshold. A significance value is input or output for each offspring of the root node, wherein the significance value indicates whether the offspring is significant.

Moreover, the method may include, for each significant offspring of the root node, adding the significant offspring to the LSP and outputting or inputting a sign of the coefficient of the significant offspring. For each insignificant offspring (an insignificant offspring of the root node has the coefficient less than the predetermined threshold), the method may include adding the insignificant offspring to the LIP. When all offspring are insignificant, with at least one significant descendant, a single zero significance value can be output with the root node on LIS, designating an entry of different type.

In another aspect, the present invention includes a data structure in a computer memory for use in encoding and decoding a subband decomposition of data points. The data structure comprises a list of insignificant sets of points ("LIS"), a list of significant points ("LSP") and a list of insignificant points ("LIP").

As an enhancement, for each set of the LIS, the data structure may include a root node and a set type identifier. The set type identifier defines generations of descendants associated with the root node within the set of the LIS, wherein a first generation of descendants comprises offspring of the root node. Moreover, the set type identifier may comprise one of a first type identifier and a second type identifier. A first type identifier designates that the set comprises all of the descendants of the root node. A second type identifier designates that the set comprises the descendants of the root node excluding the offspring of the root node.

Yet another aspect of the present invention includes a computer program product comprising a computer useable medium having computer readable program code means therein for use in encoding and decoding a subband decomposition of a data set. Computer readable program code means are employed for causing the computer to affect the techniques disclosed herein.

To summarize, the present invention has many advantages and features associated with it. The coding scheme of the present invention used to process a subband decomposition of a data set provides a high level of compression while maintaining a high computational efficiency. The transmitted code (i.e., compressed data set) is completely embedded so that a single file for, e.g., an image at a given code rate, can be truncated at various points and decoded to give a series of reconstructed images at lower rates. Processing may even be run to completion resulting in a near lossless (limited by the wavelet filters) compression. Furthermore, the encoder and decoder use symmetrical techniques such that computational complexity is equivalent during both encoding and decoding. Thus, the techniques of the present invention advance the state of subband decomposition data compression techniques. The coding results are either comparable to, or surpass, previous results obtained through much more sophisticated and computationally complex methods.

BRIEF DESCRIPTION OF THE DRAWINGS

These and various other features and aspects of the present invention will be readily understood with reference to the following detailed description taken in conjunction with the accompanying drawings, in which like or similar numbers are used throughout, and in which:

FIGS. 22a and 22b illustrate the unequal error protection form of the 3-D SPIHT algorithm and the corresponding bit rate assignment, respectively, while FIG. 22c illustrates the bitstream of the STTP-SPIHT algorithm.

DETAILED DESCRIPTION OF THE PREFERRED EMBODIMENTS

Figure 1:
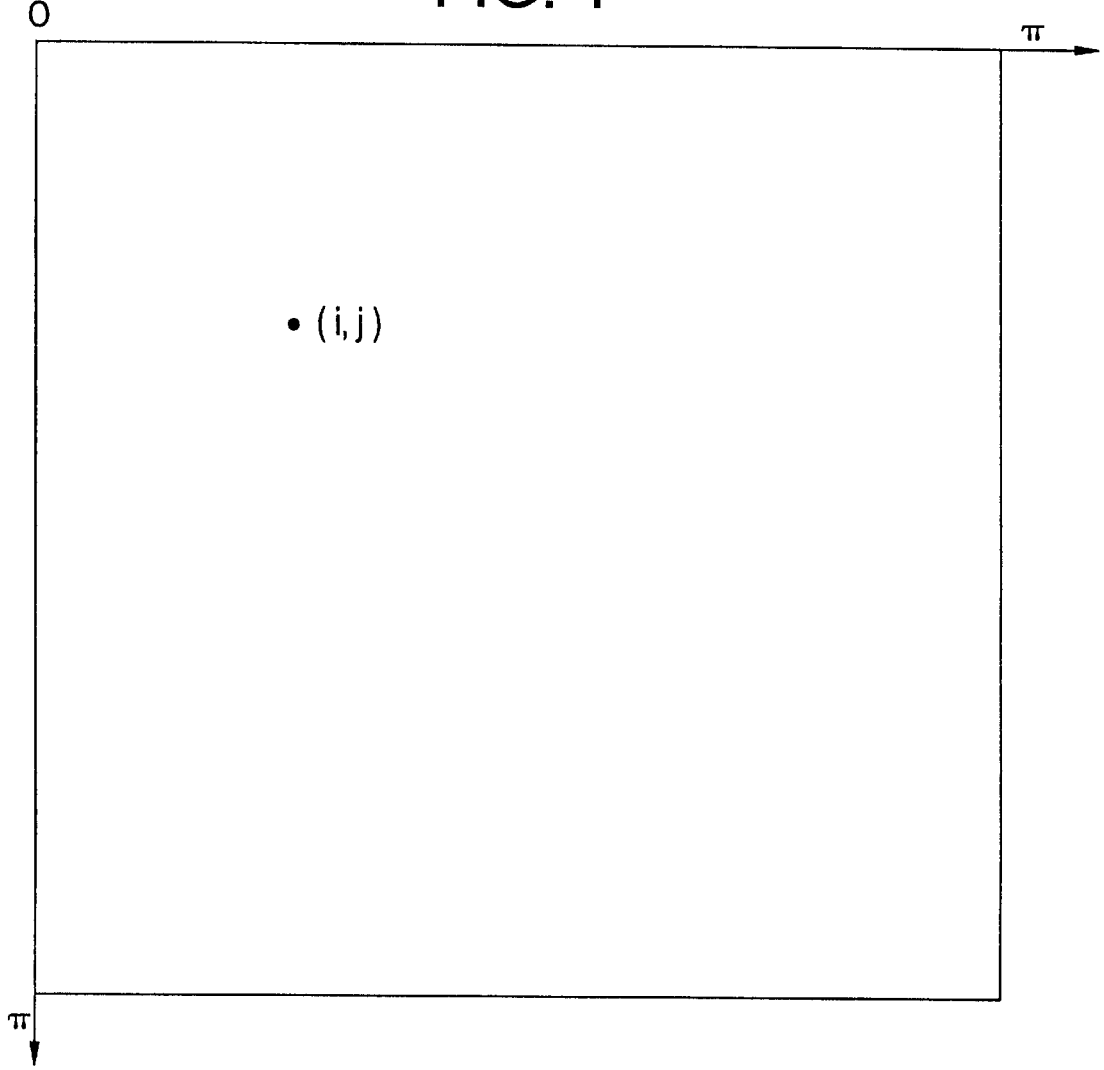
FIG. 1 is a schematic illustration of an image bitmap prior to subband decomposition.

An original image to be compressed is defined by a set of pixel values $p_{ij}$, where (i,j) is the pixel coordinate (FIG. 1). As a first step in the compression techniques of the present invention, a subband decomposition is performed on the image resulting in a two-dimensional array, wherein each element $c_{ij}$ is called a transform coefficient ("coefficient") at coordinate (i,j).

Figure 2:
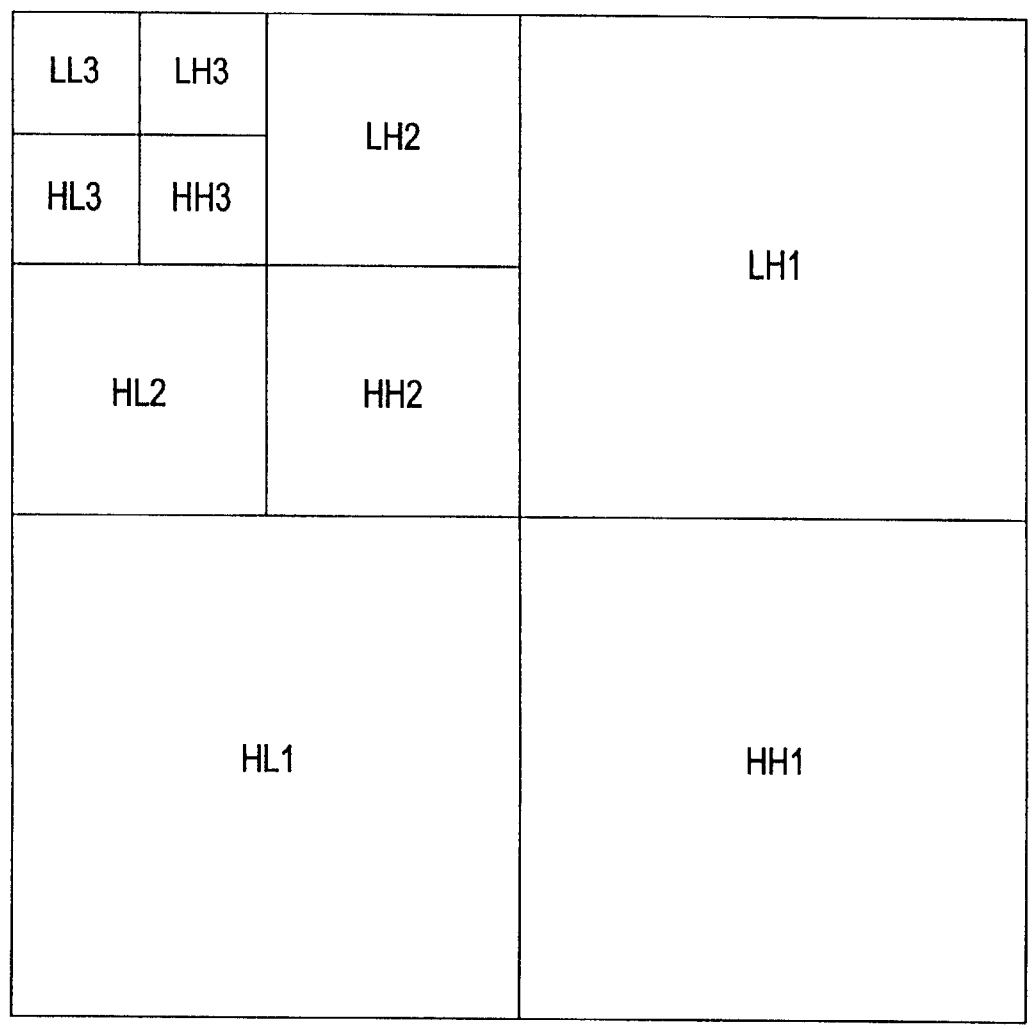
FIG. 2 is a schematic illustration of the image bitmap of FIG. 1, subsequent to subband decomposition according to an embodiment of the present invention.

In the example of FIG. 2, decomposition has been performed into three subbands. The designations of each subband, e.g., LH1, and subband decomposition methods will be apparent to one of ordinary skill in the art and are further described in, e.g., E. H. Adelson, E. Simoncelli, and R. Hingorani, "Orthogonal Pyramid Transforms for Image Coding," Proc. SPIE, Vol. 845—Visual Comm. and Image Proc. II, Cambridge, Mass., pp. 50–58, October 1987, and U.S. Pat. No. 5,321,776, entitled "DATA COMPRESSION SYSTEM INCLUDING SUCCESSIVE APPROXIMATION QUANTIZER," by Shapiro, issued Jun. 1, 1994, both of which are incorporated by reference herein in their entireties.

The principles disclosed herein improve on the techniques by which the coefficients of the transformed image are transmitted such that data compression is achieved and such that efficient decompression is facilitated. Within the present invention, ordering data corresponding to the coefficients is not explicitly transmitted. Instead, the compression technique is designed such that the execution path of the coder is defined by the results of magnitude comparisons of coefficients at branching points within the execution path. So, if the encoder and decoder have the same coding algorithm, then the decoder can duplicate the encoder's execution path if it receives the results of the magnitude comparisons, and the ordering information can therefore be recovered.

The techniques disclosed herein are performed for multiple quantization levels, with each successive quantization level defining higher numerical precision and, thus, a higher quality image. Encoding and/or decoding may be terminated when the desired quality level has been reached. More specifically, according to the techniques of the present invention, the encoding process can be stopped at any compressed file size or let run until the compressed file is a representation of a nearly lossless image. The only limitation on loss is determined by the precision of the wavelet transform filters used during subband decomposition of the source (image) data and during reconstruction of the destination (image) data. For perfectly reversible compression, one skilled in the art may use, e.g., an integer multiresolution transform, such as the S+P transform described in A. Said and W. A. Pearlman, "Reversible Image Compression via Multiresolution Representation and Predictive Coding," Proc. SPIE Conf. Visual Communications and Image Processing '93, Proc. SPIE 2094, pp. 664–674, Cambridge, Mass., November 1993, which yields excellent reversible compression results when used with the techniques disclosed herein. See also the article by A. Said and W. A. Pearlman entitled "An Image Multiresolution Representation for Lossless and Lossy Coding" (IEEE Transactions on Image Processing, Vol. 5, pp. 1303–1310 (September 1996)).

During the coding techniques according to the present invention, certain operations are performed on the points (i.e., pixels) within the subband decomposition. One operation that is performed is a "significance" test. At each quantization level, determinations of "significance" are made for sets comprising both individual points and collections of points. The "significance" test is defined as follows:

$$\max_{(i,j)\in T}\{|c_{ij}|\} \geq 2^n?$$

In the above test, n is the current quantization level and T is either a set of pixels or a single pixel. If the comparison is negative, then all of the coefficients of the points of the set T are less than the threshold ($2^n$), and T is insignificant. Conversely, if the comparison is positive, then at least one of the coefficients of the set T is greater than or equal to the threshold ($2^n$), and T is significant.

Accordingly, a significance function may be expressed as follows:

$$S_n(T) = \begin{cases} 1, \max\{|c_{i,j}|\} \geq 2^n, \\ (i,j)\varepsilon T \\ 0, \text{otherwise} \end{cases}$$

This function indicates the significance of a set T of coordinates as a "1" if significant and a "0" if not significant, i.e., insignificant. To simplify notation, single pixel sets are denoted $S_n(i,j)$.

It has been discovered that most of an image's energy is concentrated in the low frequency components. Consequently, the variance decreases as one moves from the highest to the lowest levels of the subband pyramid. Furthermore, it has been observed that there is a spatial self-similarity between subbands, and the coefficients are expected to be better magnitude-ordered when moving downward in the pyramid following the same spatial orientation. For instance, large low-activity areas are expected to be identified in the highest levels of the pyramid, and they are replicated in the lower levels at the same spatial locations.

Figure 3:
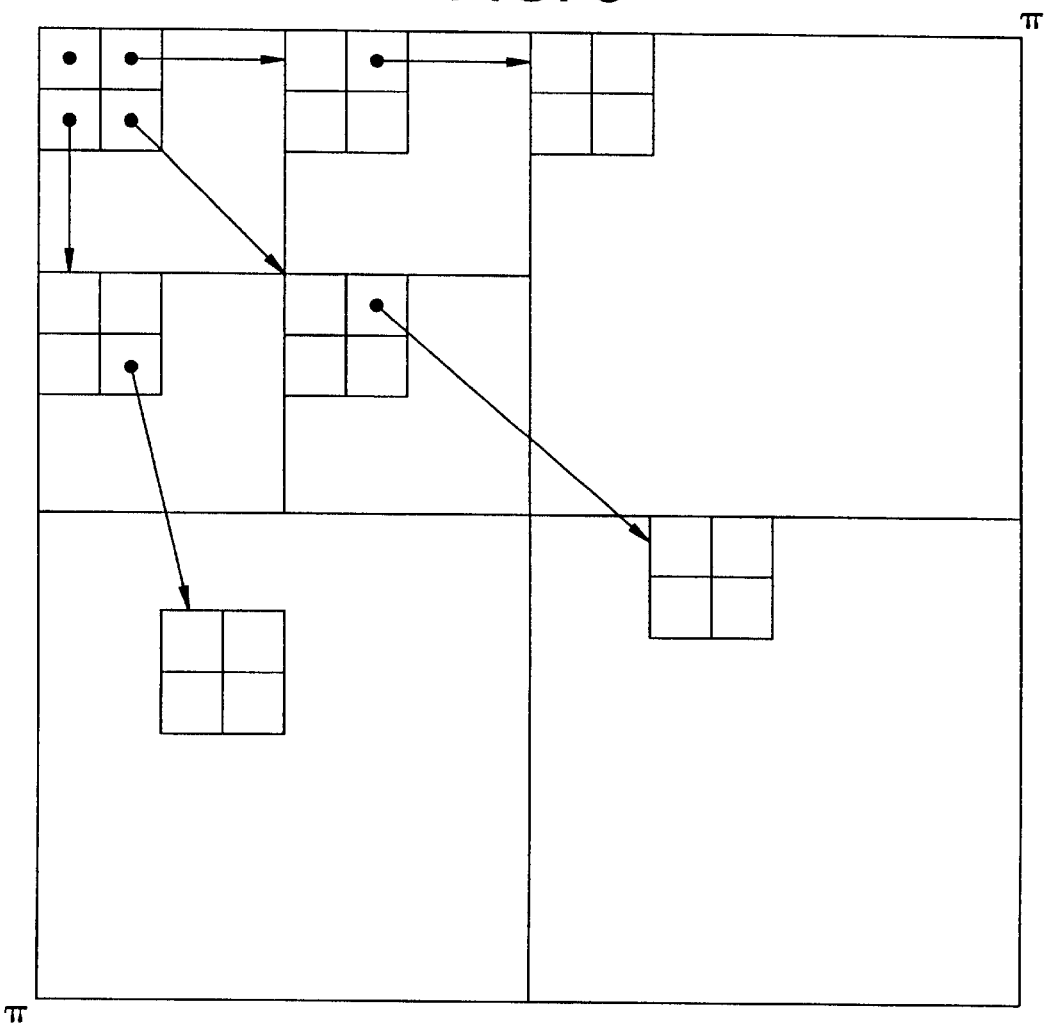
FIG. 3 is a schematic illustration of parent-child relationships within the image bitmap of FIG. 2 pursuant to one embodiment of the present invention.

According to the techniques of the present invention, a new tree structure, called a spatial orientation tree, naturally defines the above-discussed spatial relationship within the hierarchical subband pyramid. For example, FIG. 3 shows how a spatial orientation tree is defined in a pyramid that is constructed with recursive four-subband splitting. Each node of the tree corresponds to a pixel, and is identified by the pixel coordinate. Its direct descendants (offspring) correspond to the pixels of the same spatial orientation in the next finer level of the pyramid. The tree is defined such that each node has either no offspring, i.e., leaves, or four offspring, which always form a group of 2×2 adjacent pixels. In FIG. 3, the arrows are oriented from each parent node to its four offspring. The pixels in the highest level of the pyramid are the tree roots and are also grouped in 2×2 adjacent pixels. However, their offspring branching rule is different, and one of them (indicated by the start—the upper left corner point in each group) has no descendants. Each of the other three in the group has a branching to a group of four in a subband of the same orientation in the same level.

It will be appreciated that the discussion above applies to the exemplary case for 2-D data sets, e.g., still images. In particular, each data point having offspring branches into 2×2 samples. The same principle extends to any dimensionality. In 1-D data streams, the decomposition branches to 2 samples; in 3-D data streams, the data stream decomposes to 2×2×2 samples. In short, the coordinate indices are one per dimension and the trees branch into two samples per dimension.

Parts of the spatial orientation trees are used as partitioning subsets in the coding process. Accordingly, the following sets of coordinates are defined herein for use in connection with the techniques of the present invention:

O(i,j): set with the coordinates of all offspring (i.e., children) of node (i,j);

D(i,j): coordinates of all descendants (i.e., children and following generations) of the node (i,j);

H: coordinates of all spatial orientation tree roots (i.e., points in the highest pyramid level, e.g., LL3); and L(i,j)=D(i,j)−O(i,j).

With reference to FIG. 3, except at the highest and lowest pyramid levels, the relationship between levels comprises:

$$O(i,j)=\{(2i,2j),(2i,2j+1),(2i+1,2j),(2i+1,2j+1)\}$$

To perform the coding of the subband coefficients, three ordered lists are employed. They are the list of insignificant sets of pixels ("LIS"), the list of insignificant pixels ("LIP"), and the list of significant pixels ("LSP"). In these lists, each entry is identified by a coordinate (i,j), which in the LIP and LSP represent individual pixels, and in the LIS represents either the set D(i,j) or L(i,j). To differentiate between D(i,j) and L(i,j) in the LIS, a set type identifier is included with the root node (i,j) coordinate pair and comprises a type A identifier if the set comprises D(i,j), and a type B identifier if the set comprises L(i,j).

Figure 4:
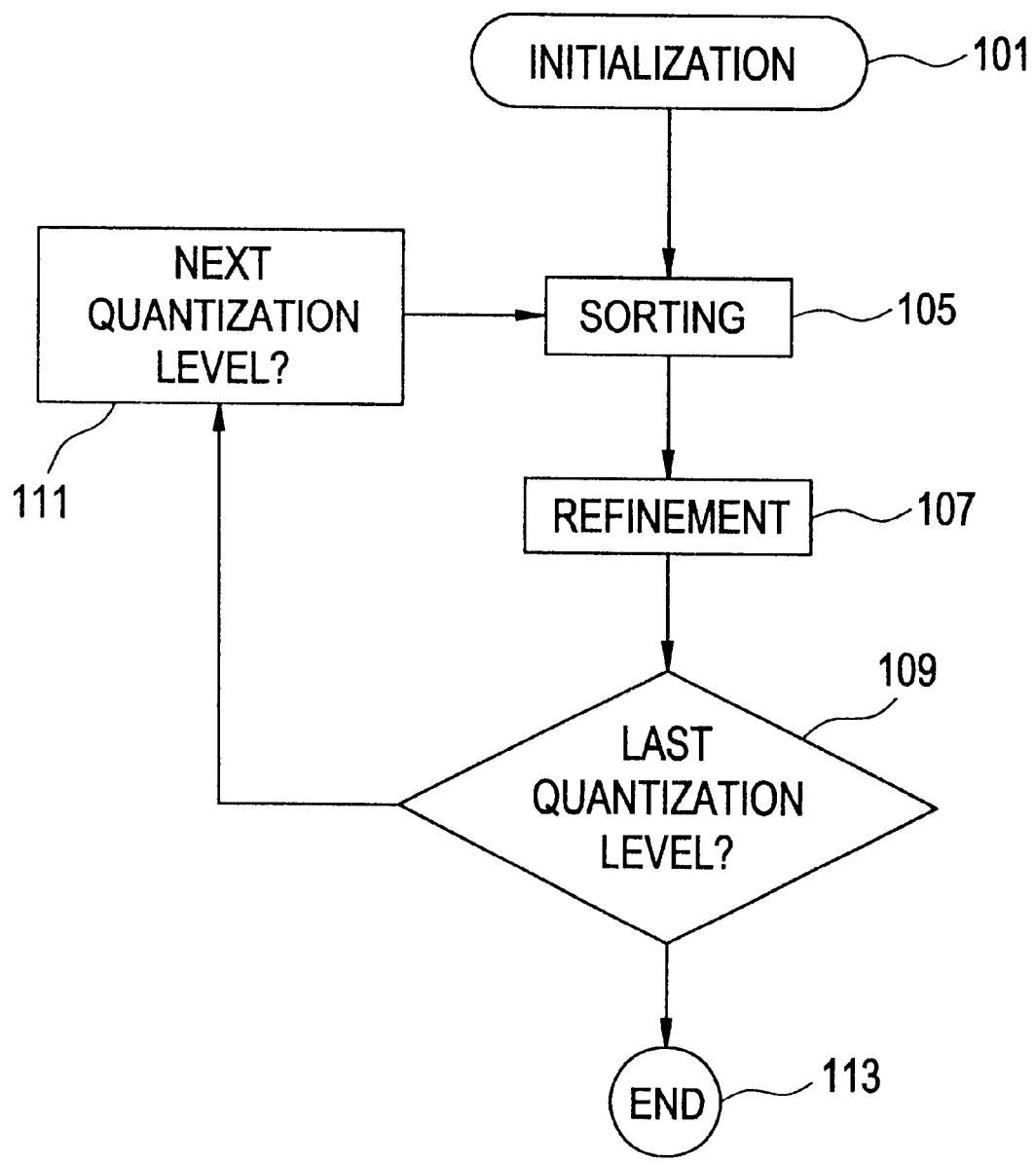
FIG. 4 is a flow diagram of the coding method of an embodiment of the present invention.

A high-level flow diagram of the coding technique of the present invention is shown in FIG. 4. Prior to beginning coding, it is assumed that a subband decomposition of a subject image has already been performed as discussed hereinabove. During initialization (101), the lists (LIS, LIP and LSP) used herein are created and the initial quantization level is determined. Thereafter, a sorting phase is entered (105). Sorting includes the processing of the lists used herein and the outputting of compressed data based upon such processing. A refinement phase (107) is entered after sorting, during which data corresponding to pixels determined to be significant during sorting of earlier quantization levels is output. A test is performed to determine if the last quantization level has been processed (109) and, if not, the next quantization level is determined (111) and the method repeats starting with the sorting phase (105). After the last quantization level has been processed, data compression is completed (113).

By way of summary, with regard to the sorting phase, the pixels in the LIP are tested, and those that are significant at the current quantization level are moved to the LSP. Similarly, sets are sequentially evaluated following the LIS order, and when a set is found to be significant, it is removed from the LIS and partitioned into new subsets. The new subsets with more than one element are added back to the LIS, while the single-coordinate sets are added to the end of the LIP or to the end of the LSP, depending on whether they are insignificant or significant, respectively.

As discussed above, pixels in the LIP are evaluated prior to the evaluation of sets of pixels in the LIS. This ordering is established because information regarding a pixel is transmitted immediately, thus immediately reducing distortion in the received image. However, information regarding sets is used to generate new tests for sets and pixels which do not have an immediate effect on the received image. Moreover, as discussed in further detail below, if a pixel is moved to a list during set processing, information regarding the moved pixel is immediately transmitted such that distortion in the received image is immediately reduced. Throughout the techniques of the present invention, priority is given to transmitting pixel information as quickly as possible such that the received image may be quickly reconstructed.

The above-summarized coding method is described in greater detail below in conjunction with the flow diagrams of FIGS. 5–8. A discussion of the initialization phase begins with reference to FIG. 5. An initial quantization level n is determined (121) as function of:

$$n=\lfloor \log_2(\max_{(i,j)}\{|c_{ij}|\})\rfloor$$

This n represents the number of bits of dynamic range that are required to represent the largest coefficient of the subband decomposition of the source image. For example, if the largest magnitude value of any coefficient within the image is 234, then n would equal 7. The initial quantization level is then output into the compressed bit stream (123).

The lists used by the present invention are next initialized. Specifically, the LSP initially comprises the empty set (125). The LIP (127) includes all of the data points within the highest level LL subband H (e.g., LL3 of FIG. 2). All of the data points within the highest LL subband having descendant trees are also used as the initial root nodes of the LIS (129) and are designated as set type A (i.e., D(i,j)). The points in the LIP and the corresponding roots in the LIS are initially listed in the same order.

Figure 5:
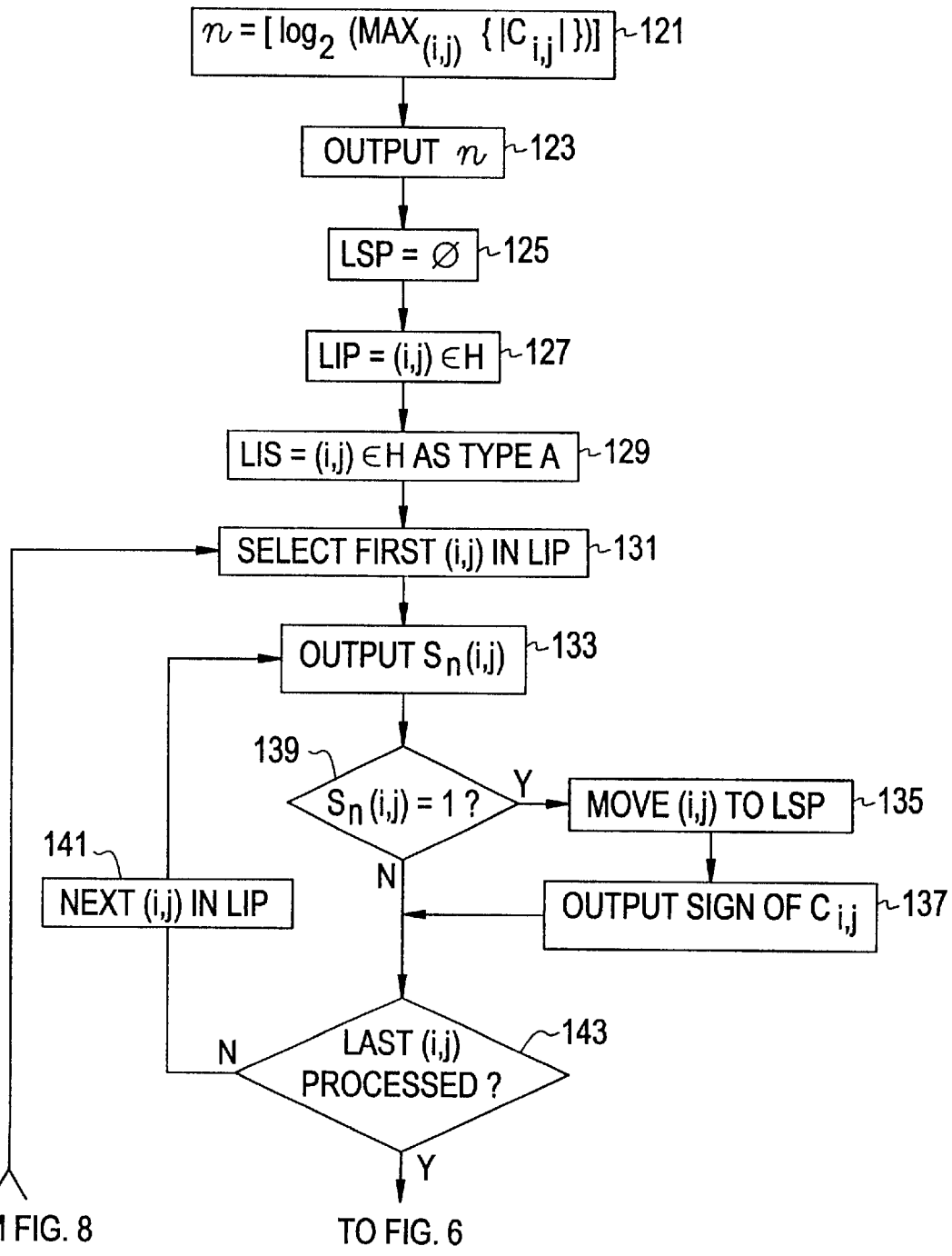
FIGS. 5–8 are more detailed flow diagrams of the coding method of FIG. 4.

Subsequent to initialization, each pixel within the LIP is processed beginning with the first pixel (i,j) therein (FIG. 5, step 131). The significance (as discussed hereinabove) of the pixel is output into the compressed data stream (133). If the pixel is significant (139), then it is moved off of the LIP and to the LSP (135). Further, if significant, the sign of the coefficient of the pixel ($c_{ij}$) is output into the compressed bit stream (137). Thereafter (and also if the pixel was not significant) a test is performed to determine if it was the last pixel of the LIP (143), and if not, the next pixel in the LIP is selected (141) and processing repeats (at step 133).

Figure 6:
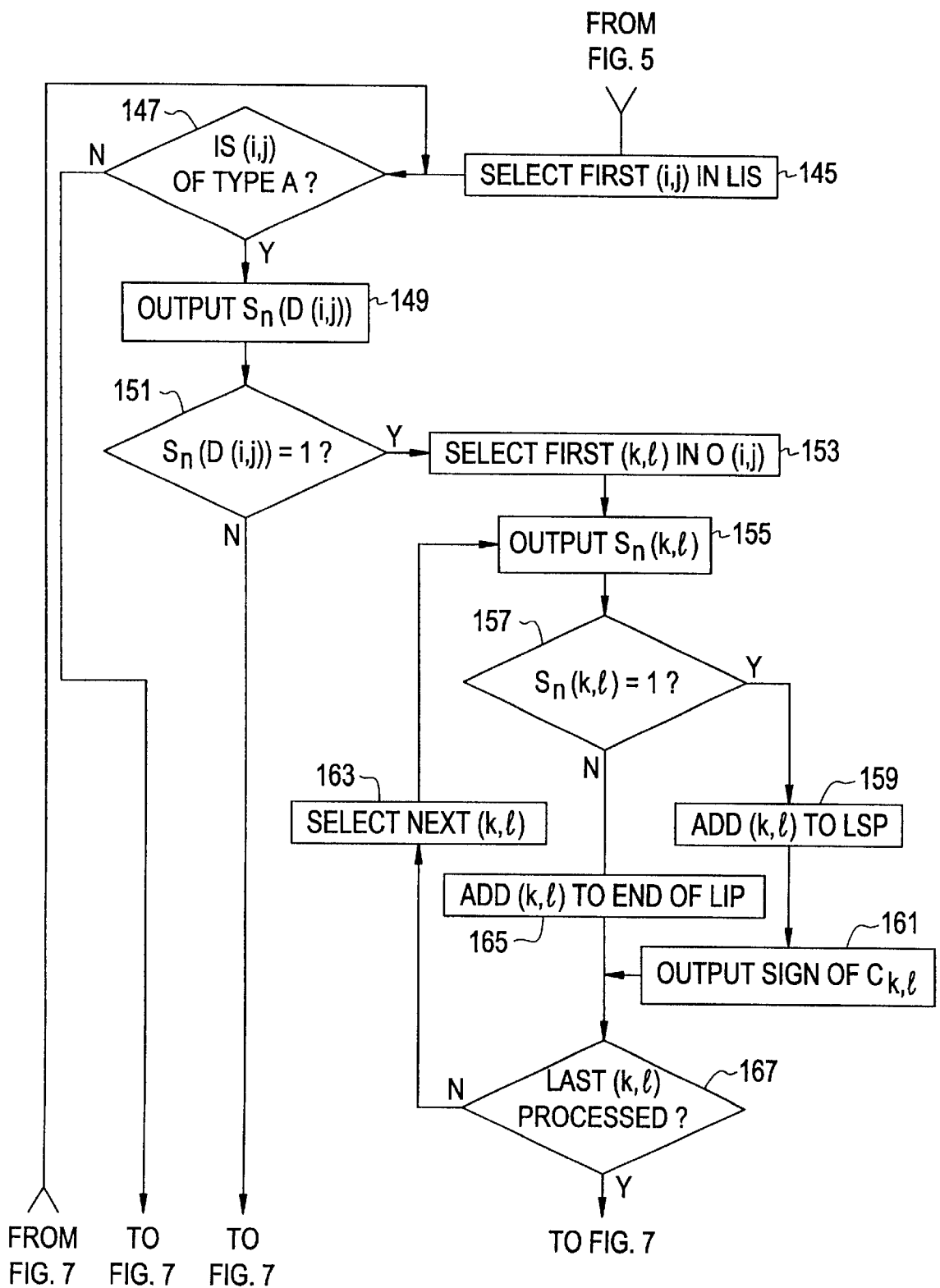

After the above-discussed processing of the LIP is completed, processing of the LIS begins (FIG. 6). An outside loop for processing each entry within the LIS begins with the selection of the first set within the LIS as designated by its root node (i,j) (145). The set type is then tested to determine if it is a type A (147) and processing diverges based thereon.

If the set is of type A, meaning that the set comprises D(i,j), the significance of D(i,j) is tested, and its significance value $S_n(D(i,j))$ is output into the compressed bit stream (149). If D(i,j) is not significant (151), then processing continues with a test to determine if all sets in the LIS have been processed (181, FIG. 7), and the selection of the next set in the LIS (179) and looping (to step 147) if processing of all sets in the LIS has not completed.

To continue, if D(i,j) is significant (151, FIG. 6), then each pixel (k,l) within O(i,j) (i.e., the offspring of (i,j)) is processed as defined by the loop which includes first (k,l)

selection (153), last (k,l) processed test (167), and next (k,l) selection (163). Within this loop, $S_n$(k,l) is output (155). If (k,l) is significant (157), (k,l) is added to the LSP, and the sign of $c_{k,l}$ is output (161). If (k,l) is not significant, then (k,l) is added to the LIP (165). According to an alternative preferred embodiment, (k,l) and $S_n$(k,l) advantageously can be moved to a temporary buffer (memory) if $S_n$(k,l)=0, i.e., the value of $S_n$(k,l) is insignificant, for every (k,l) in O(i,j). In either case, processing within the loop continues for each (k,l) in O(i,j).

Figure 7:
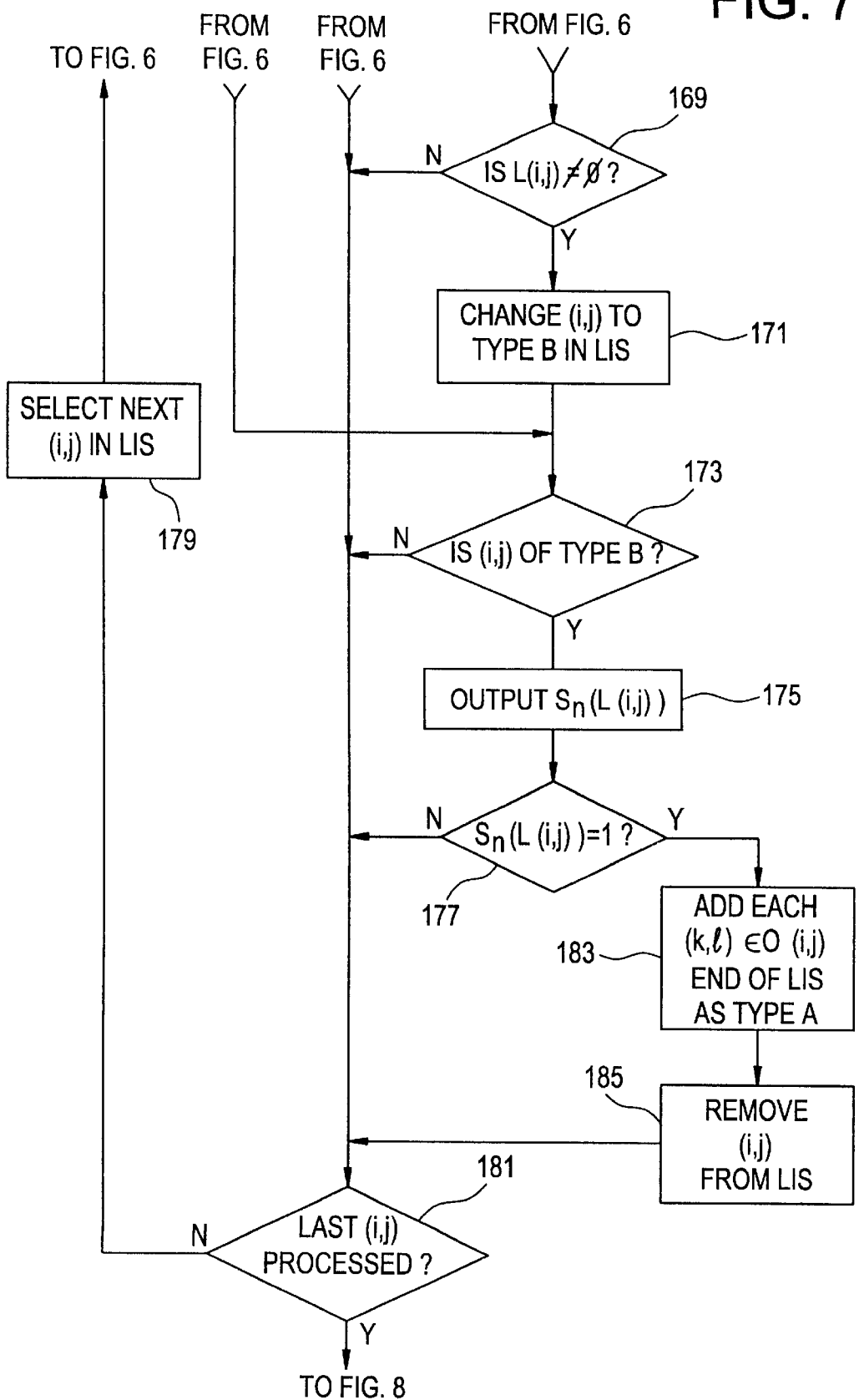

After the processing of O(i,j) is completed, a test is performed to determine whether the set L(i,j) is not empty (169, FIG. 7). If it is not empty, then the set designated by root node (i,j) in the LIS is changed to a type B set (171) and processing continues with the type B processing discussed below. If L(i,j) comprises the empty set, then the processing of each set within the LIS continues (181).

To recall, a test was performed to determine if the current set was of set type A (147). A corresponding test is performed in the flow diagram of FIG. 7, to determine if the current set comprises a type B set (173). If the set is not of type B, then the processing of each set within the LIS continues (181, 179). However, if the current set is of type B, then $S_n$(L(i,j)) is output (175). Thereafter, if L(i,j) is significant (177), then each (k,l) within O(i,j) is added as a root node to the end of the LIS as type A (183) and the current root node (i,j) is removed from the LIS (185). In another alternative preferred embodiment, if all (k,l) in O(i,j) are insignificant while L(i,j) is significant, (i,j) is retained in LIS as special type "C," designating an insignificant set O(i,j). It should be noted that each entry added to the end of the LIS (183) is evaluated before the current sorting pass ends. It should also be noted that although designation of another LIS set type may require up to an additional single bit per LIS entry (when uncoded), it saves testing and transmission of all 0's for the offspring when the L(i,j) set is significant. When this situation occurs often enough, as has been found for electro-cardiogram signals, it saves bit rate. In any event, processing of each set within LIS thereafter continues (181, 179).

Figure 8:
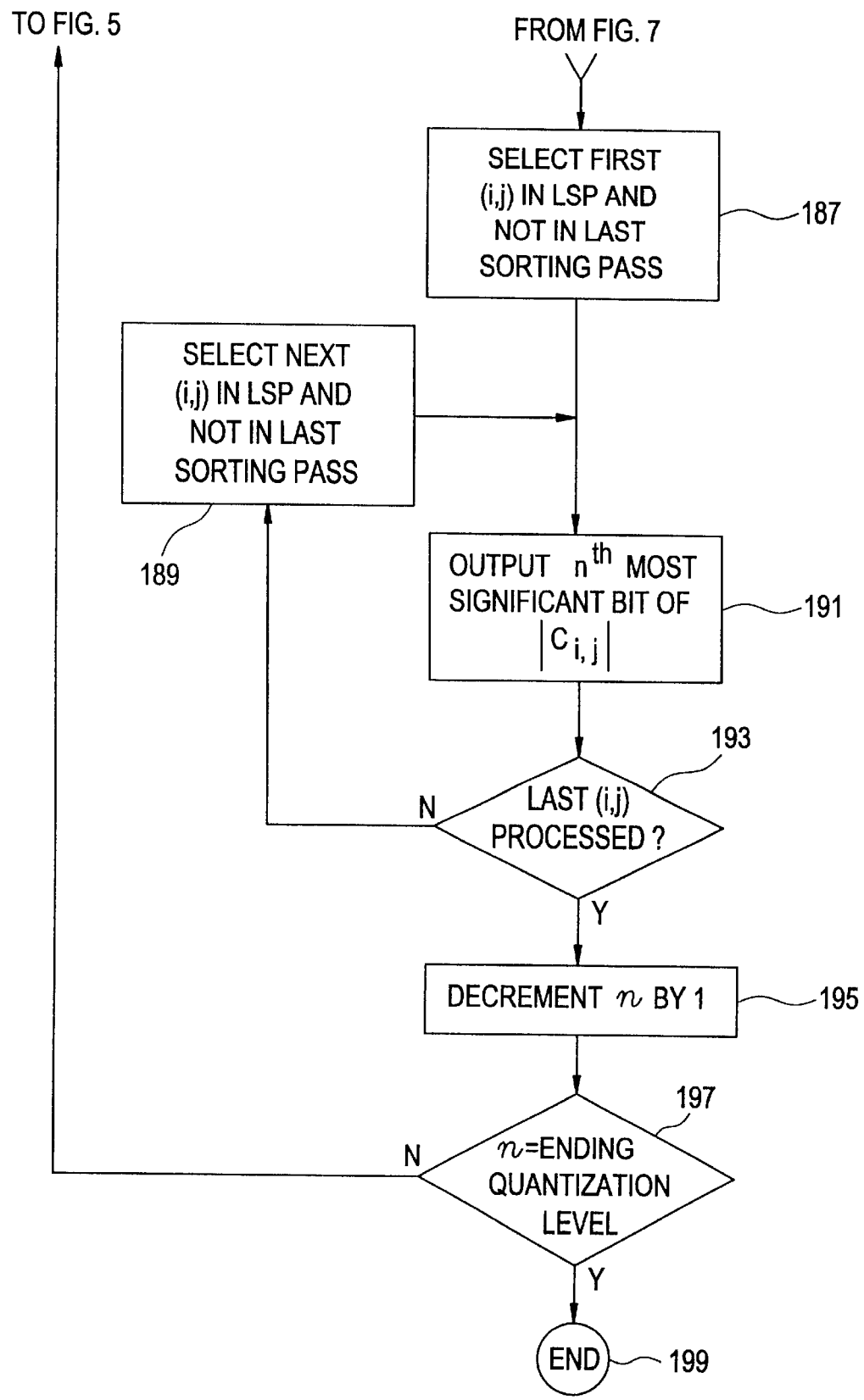

The refinement stage of the coding process is next performed (FIG. 8). During this stage, data is output for pixels in the LSP that were placed there during prior sorting passes (i.e., from previous quantization levels). Refinement begins with the selection of a first pixel (i,j) within the LSP that was not placed there during the immediately preceding sorting pass (187). The avoidance of those pixels placed on the LSP during the preceding sorting pass may be achieved by many programming techniques including, e.g., marking the end of the LSP prior to each sorting pass.

To continue, the $n^{th}$ (n=quantization level) most significant bit of the coefficient of the selected pixel ($c_{ij}$) is output (191). A test is then performed to determine if the last pixel within the LSP has been processed (193), and if it has not, then the next pixel in the LSP is selected (189) and the process repeats.

The current quantization level is then decreased by one (195). If the ending quantization level has not yet been processed (197), then processing repeats beginning with the sorting phase (FIG. 5, step 131). Once processing of the ending quantization level has been completed, the process ends (199). The ending quantization level is predesigned to achieve a selected image quality/compression ratio.

Although designation of another LIS set type may require up to an additional single bit per LIS entry (when uncoded), it saves testing and transmission of all 0's for the offspring when the L(i,j) set is significant. When this situation occurs often enough, as has been found for electrocardiogram signals, it saves bit rate.

In the above discussion, the specific order of processing the lists, LIP, LIS and then LSP, is chosen so that when processing terminates at any point prior to completion of a sorting pass at any quantization level, the coefficient just found to be significant at that level can be reconstructed approximately, because their significance data and signs have been outputted or inputted. In this way, the best reconstruction fidelity is obtained for any given compressed file size. If the order of processing the three lists is changed, the best reconstruction fidelity is obtained only at compressed file sizes corresponding to completion of processing all three lists LIP, LIS and LSP for a given quantization level n.

According to the techniques disclosed herein, branching conditions based on the significance data $S_n$ that are calculated for $c_{ij}$ are output into the compressed bit stream by the encoder. A decoding method is created by duplicating the encoder's execution path for sorting significant coefficients, but replacing each "output" with an "input." Whenever the decoder inputs data, its three control lists (LIS, LIP, and LSP) are identical to the ones used by the encoder at the moment it outputs that data. Thus, the decoder recovers the ordering from the execution path. The coding scheme of the present invention therefore results in an encoder and decoder that are symmetrical and have the same computational complexity.

In more specific regard to the decoder, an additional task performed thereby is to update the reconstructed image. For the value of n, when a coordinate is moved to the LSP, it is known that $2^n <= |c_{ij}| < 2^{n-1}$. So, the decoder uses that information, plus the sign bit that is input just after the insertion in the LSP, to set $\hat{c}_{ij} = \pm 1.5 \times 2^n$. Similarly, during the refinement pass, the decoder adds or subtracts $2^{n-1}$ to $\hat{c}_{ij}$ when it inputs the bits of the binary representation of $|c_{ij}|$. In this manner, the distortion gradually decreases during both the sorting and the refinement passes.

As with any other coding method, the efficiency of the encoder disclosed herein can be improved by entropy-coding its output, but at the expense of a larger encoding/decoding time. Practical experiments have shown that some improvements in performance are obtained by entropy-coding the coefficient signs and/or the bits put out during the refinement pass.

In another embodiment of the present invention, coding efficiency is enhanced by keeping groups of 2×2 coordinates together in the lists (LIS, LIP and LSP) and coding their significance values as a single symbol. In this group of four pixels, each one is significant if its coefficient is greater than or equal to the threshold, $2^n$. Since the decoder only needs to know the transition from insignificant to significant (the inverse is impossible), the amount of information that needs to be coded changes according to the number m of insignificant pixels in that group, and in each case, it can be conveyed by an entropy-coding alphabet with $2^m$ symbols. With arithmetic coding, it is straightforward to use several adaptive models, each with $2^m$ symbols, m ∈ {1, 2, 3, 4}, to code the information in a group of four pixels.

By coding the significance information together, the average bit rate corresponds to a $m^{th}$ order entropy. At the same time, by using different models for the different number of insignificant pixels, each adaptive model contains probabilities conditioned to the fact that a certain number of adjacent pixels are significant or insignificant. Accordingly, the dependence between magnitudes of adjacent pixels is fully exploited. This scheme is also useable to code the significance of trees rooted in groups of 2×2 pixels.

A particular data structure is useful in connection with representing groups of 2×2 pixels together in the lists of the present invention. The data structure of each tree node (i.e., group of 2×2 pixels) is represented by the following "C" programming code:

```
-{
   int x,y;
   long state;
   Tree_Node * next;
};
```

The pair (x,y) contains the image coordinate of the upper-left pixel of the group. The pair (x,y) therefore represents the coordinates of an upper-left pixel of the group of four pixels. The pixels in the group are numbered as follows:

0 1
2 3

Thus, to obtain the coordinates of a pixel in the group, one of four pairs of values is added to (x,y). The four pairs comprise:

(0,0)—pixel 0
(1,0)—pixel 1
(0,1)—pixel 2
(1,1)—pixel 3

The variable 'state' contains significance data related to the set of four pixels and is used in the processing described herein. Specifically, 'state' contains significance data for the four pixels and for the four groups of descendants for the four pixels.

The even-numbered bits of 'state' indicate whether the individual pixels of the group are significant, and the odd-numbered pixels indicate if the descendant sets are significant. Thus, if $P_k$ is the significance value of pixel k (in the 2×2 block), and $S_k$ is the significance value for the set descending from pixel k (the significance value of a set of four pixels is calculated using the maximum magnitude of the coefficient of the four pixels), then the eight least significant bits of 'state' comprise:

S3 P3 S2 P2 S1 P1 S0 P0

For example, if the eight least significant bits of 'state' comprise "0 0 1 0 0 1 0 0," then only the descendant set of pixel 2 and individual pixel 1 are significant. The other pixels and descendant sets are insignificant.

The above-discussed 'state' variable is easily tested for conditions. For example, one test comprises the following "C" programming code:

if (group—>state & 0xAA==0) then . . .

In one statement, this test determines if all sets of descendants of the 2×2 group are insignificant ('group' is a pointer to a one tree node). According to the set decomposition scheme, if the result of this test is 'true', it means that the LIS entry is of type 'A'; otherwise it is of type 'B'.

The pointer 'next' in the data structure is used to create a dynamically allocated linked list. The entries are created when needed and disposed of when not needed. Specifically, entries are created whenever a new set (tree) is added to the LIS and are deleted when, e.g., all bits within 'state' are set to one (i.e., all pixels in the set and their descendants are significant).

Figure 9:
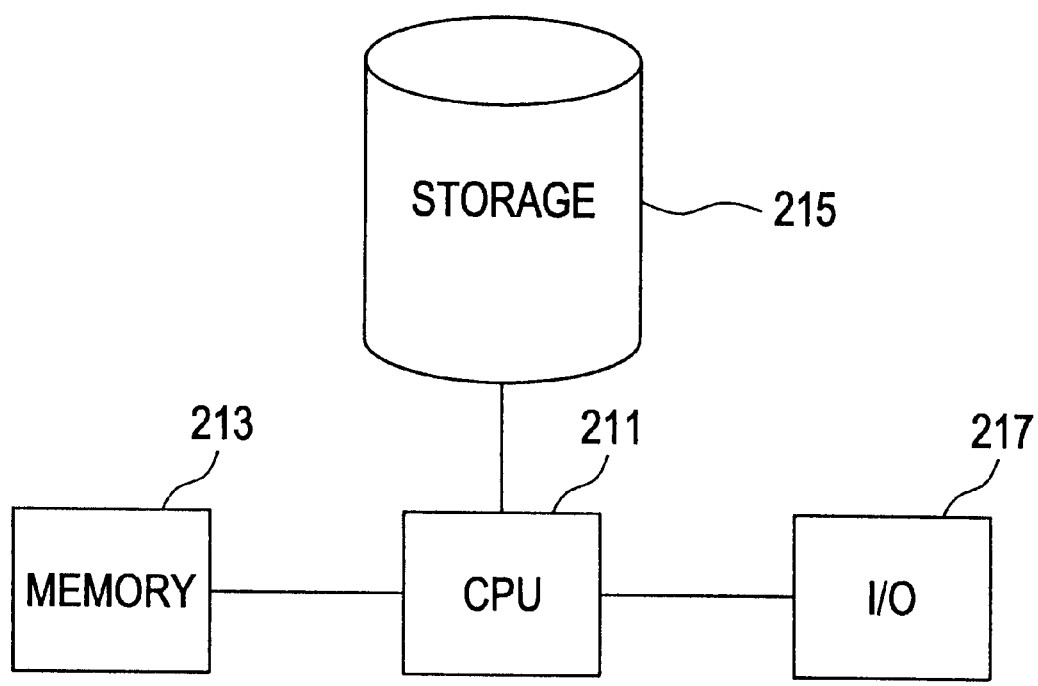
FIG. 9 is a block diagram of a computer system used in implementing the principles of the present invention.

The hardware elements of a design system used to implement the techniques of the present invention are shown in FIG. 9. A central processing unit ("CPU") 211 provides main processing functionality. A memory 213 is coupled to CPU 211 for providing operational storage of programs and data.

Memory 213 may comprise, for example, random access memory ("RAM") or read only memory ("ROM"). Non-volatile storage of, for example, data files and programs is provided by a storage 215 that may comprise, for example, disk storage. Both memory 213 and storage 215 comprise a computer useable medium that may store computer program products in the form of computer readable program code. User input and output is provided by an input/output ("I/O") facility 217. I/O facility 217 may include, for example, a graphical display, a mouse and/or a graphics tablet. As an example, the design system of FIG. 9 may comprise an International Business Machines RISC System/6000 computer executing an AIX operating system.

Figure 10:
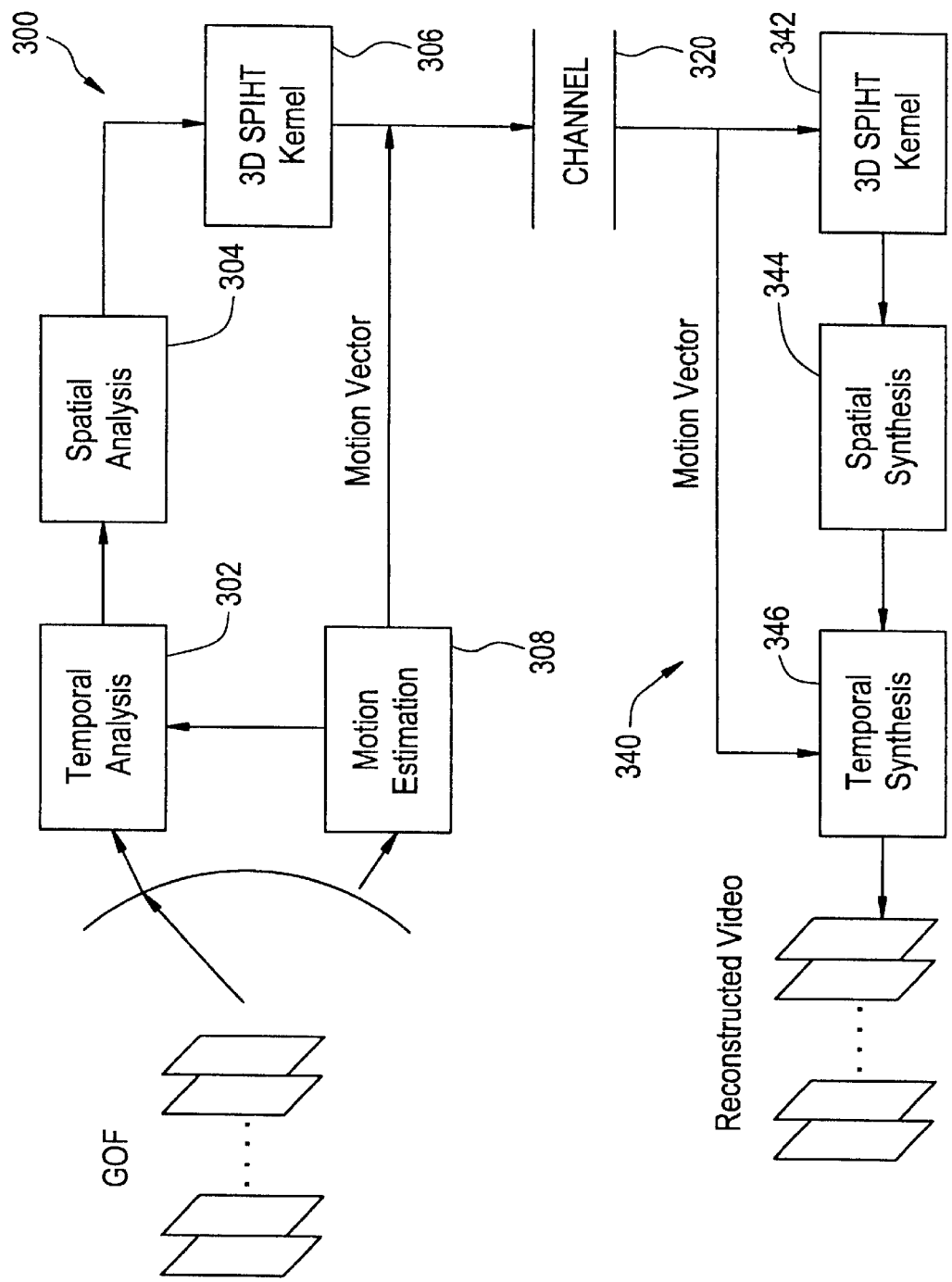
FIG. 10 is a high level block diagram of a 3-D subband image sequence coder and complementary decoder according to the present invention.

In another preferred embodiment of the present invention, an image sequence coding system illustrated in FIG. 10 consists primarily of a 3-D analysis section (with/without motion compensation), and a coding section including a 3-D SPIHT kernel. As will be noted from FIG. 10, the decoder has the structure symmetric to that of encoder. More specifically, the coder 300 advantageously includes a temporal analysis circuit 302, a spatial analysis circuit 304 and a 3-D SPIHT kernel 306. In the exemplary embodiment illustrated in FIG. 10, a motion estimation circuit 308 advantageously can, but need not be, included for video. In FIG. 10, a communication channel 320 transfers the output of the coder 300, i.e., the compressed video data, to the decoder 340, which includes a 3-D SPIHT kernel 342, a spatial synthesis circuit 344 and a temporal synthesis circuit 346, serially coupled to one another. The operation of the various components illustrated in FIG. 10 will be described below.

As shown in FIG. 10, selected frames forming a group of pictures, hereafter called GOP, will be first temporally transformed with/without motion compensation by temporal analysis circuit 302. Then, each resulting frame will again be separately transformed in the spatial domain by spatial analysis circuit 304. When motion compensated filtering is performed using motion estimation circuit 308, the motion vectors are separately lossless-coded, and transmitted over the transmission channel 320 with high priority. It should be mentioned that in the exemplary coding system of FIG. 10, there is no complication of a rate allocation, nor is there a feedback loop of prediction error signal, which may degrade the efficiency of the system. With the 3-D SPIHT kernel 306, the preset rate will be allocated over each frame of the GOP automatically according to the distribution of actual magnitudes. However, it is possible to introduce a scheme for bit re-alignment by simply scaling one or more subbands to emphasize or de-emphasize the bands so as to artificially control the visual quality of the video in the GOP. This scheme is also applicable to color planes of video, since it is well known fact that chrominance components are less sensitive than the luminance component to the human observer.

Figure 11:
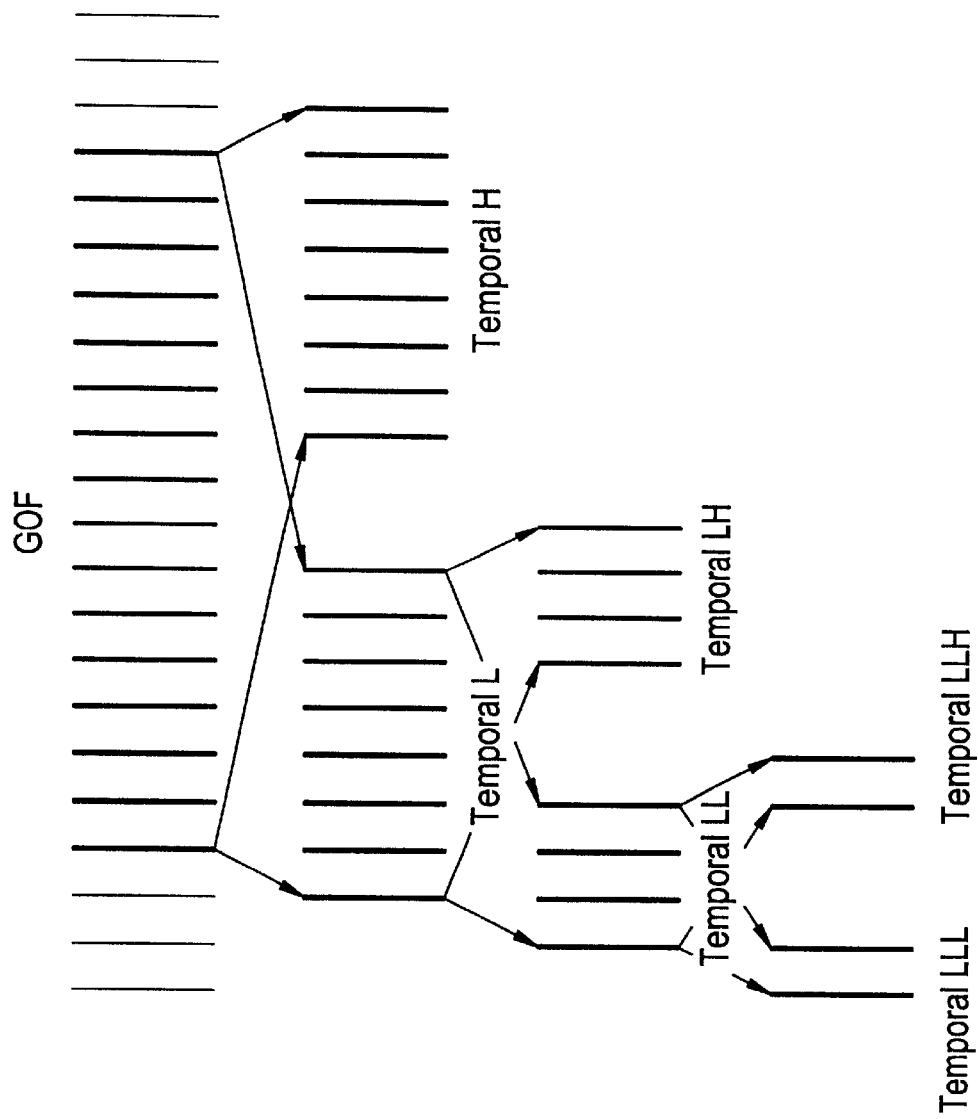
FIG. 11 is an illustration of a dyadic temporal decomposition of a group of pictures (GOP) which is useful in explaining the operation of the circuitry depicted in FIG. 10.

As will be appreciated from FIG. 11, a GOP advantageously can first be decomposed temporally and then spatially into subbands when input to a bank of filters and subsampled. In FIG. 11, for example, a GOP can be decomposed into four temporal frequency bands by recursive decomposition of the low temporal subband. It should be mentioned that the temporal filter, i.e., the temporal analysis circuit 302 can be a one-dimensional (1-D) unitary filter, although other filter forms advantageously can be used. The temporal decomposition will be followed by 2-D spatial decomposition with separable unitary filters, i.e., spatial analysis circuit 304. As illustrated, this temporal decomposition is the same as performed by conventional temporal decomposition circuitry. Moreover, since the temporal high frequency usually does not contain much energy, conventional temporal decomposition circuitry usually applies only one level of temporal decomposition. However, in this preferred embodiment according to the present invention, it has been determined that further dyadic decompositions in the temporal high frequency band upstream of the 3-D SPIHT kernel 306 provides advantages over traditional methods and circuitry in terms of peak signal-to-noise ratio (PSNR) and visual quality. Thus, subsequent discussions of spatial analysis refer to a dyadic two-dimensional (2-D) recursive decomposition of the low spatial frequency subband. It should be mentioned here that the total number of samples in the GOP remains the same at each step in temporal or spatial analysis through the critical subsampling process.

Figure 12:
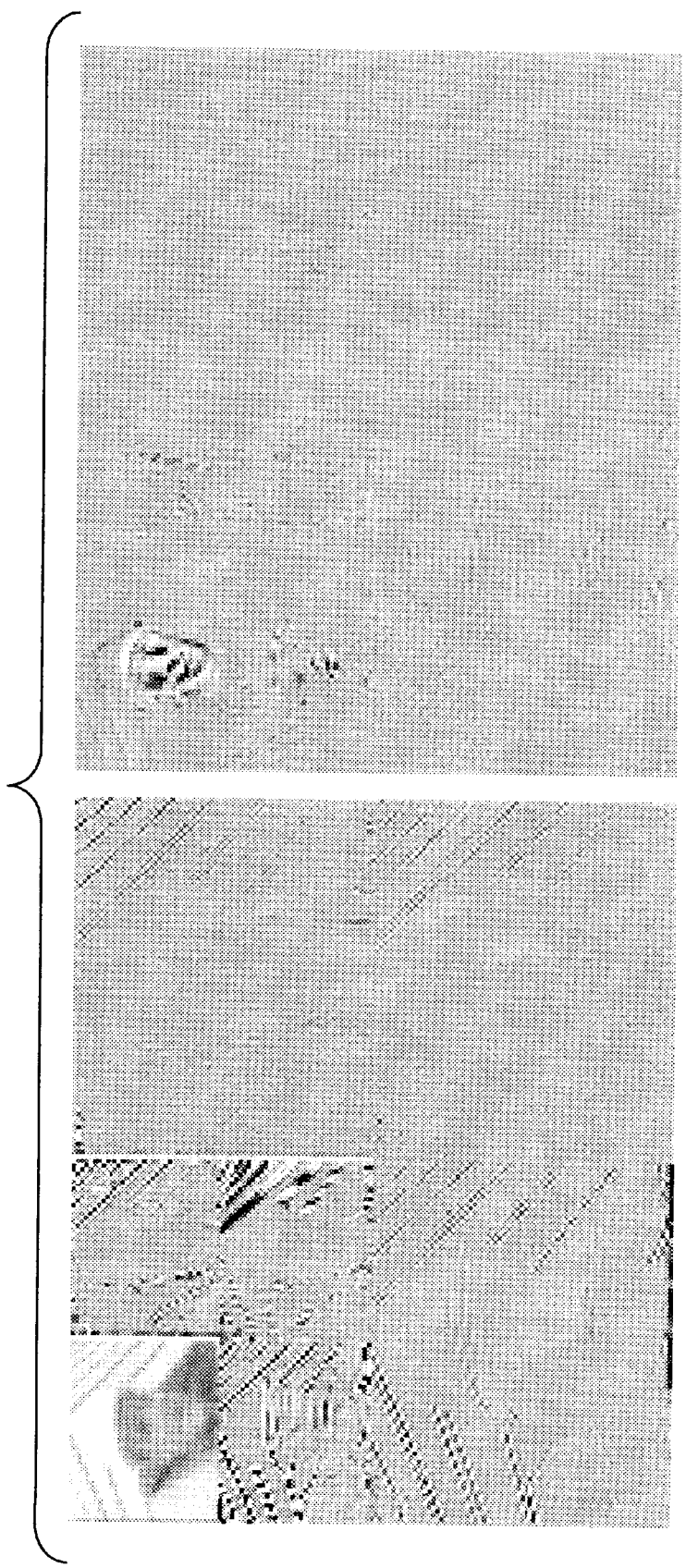
FIG. 12 illustrates a two level dyadic spatial decomposition.

By way of illustration, FIG. 12 shows two templates, the lowest temporal subband, and the highest temporal subband, of typical 3-D wavelet transformed frames with the "foreman" video sequence of QCIF format (176×144). Two levels of decomposition were selected in the spatial domain just for illustration of the different 3-D subband spatial characteristics in the temporal high frequency band. Hence, the lowest spatial band of each frame has dimension of 44×36. It will be appreciated that each spatial band of the frames is appropriately scaled before it is displayed. Although most of the energy is concentrated in the temporal low frequency, there exists much spatial residual redundancy in the high temporal frequency band due to either object or camera motion. This is the main motivation of further spatial decomposition even in the temporal high subband.

Besides, it will be appreciated that not only spatial similarity inside each frame across the different scale can be observed, but also temporal similarity between two frames, which will be efficiently exploited by the 3-D SPIHT algorithm in the 3-D SPIHT kernel 306. It should also be mentioned that when there is fast motion or a scene change, temporal linkages of pixels through the trees do not provide any advantage in predicting insignificance (with respect to a given magnitude threshold). However, linkages in the trees contained within a frame will still be effective for prediction of insignificance spatially. For volume medical images, linkage of pixels across the third (axial) dimension is likely to provide an advantage.

It should be noted that the 3-D SPIHT methodology is extended from the 2-D SPIHT methodology discussed above. Advantageously, the 3-D SPIHT methodology has the following three similar characteristics:

(1) partial ordering by magnitude of the 3-D wavelet transformed video with a 3-D set partitioning algorithm;

(2) ordered bit plane transmission of refinement bits; and (3) exploitation of self-similarity across spatio-temporal orientation trees.

In this way, the compressed bit stream will be completely embedded, so that a single file for a GOP of an image sequence can provide progressive video quality, i.e., the algorithm can be stopped at any compressed file size or let run until nearly lossless reconstruction is obtained, which is desirable in many applications including HDTV. Stated another way, the compressed bit stream is completely embedded by coding units, e.g., GOPs, so that a predetermined number of bits from the first portion of an output bit stream for each GOP advantageously can be decoded to provide an output image sequence having a lowered resolution.

As mentioned above with respect to the basic concepts of 2-D SPIHT methodology, there is no constraint to dimensionality in the algorithm itself. Once pixels have been sorted, there is no concept of dimensionality. If all pixels are lined up in magnitude decreasing order, then what matters is how to transmit significance information with respect to a given threshold. In 3-D SPIHT coding method according to the present invention, sorting of pixels proceeds just as it would with 2-D SPIHT method, the only difference being the use of 3-D rather than 2-D tree sets. Once the sorting is done, the refinement stage performed by the 3-D SPIHT kernel 306 will be exactly the same.

A natural question arises as to how to sort the pixels of a three dimensional video sequence. Recall that for an efficient sorting algorithm, the 2-D SPIHT method utilizes a 2-D subband/wavelet transform to compact most of the energy to a certain small number of pixels, and generates a large number of pixels with small or even zero values. Extending this idea, one can easily envision a 3-D wavelet transform operating on a 3-D video sequence, which will naturally lead to a 3-D video coding method.

With respect to the 3-D subband structure, a new 3-D spatio-temporal orientation tree, and its parent-offspring relationships, advantageously can be defined. For ease of explanation, first consider the 2-D SPIHT method, wherein a node consists of 4 adjacent pixels as shown in FIG. 3, and a tree is defined such a way that each node has either no offspring (the leaves) or four offspring, which always form a group of 2×2 adjacent pixels. Pixels in the highest levels of the pyramid are tree roots and 2×2 adjacent pixels are also grouped into a root node, one of them (indicated by the star mark in FIG. 3 having no descendants.

A straightforward approach to form a node usable in the 3-D SPIHT methodology is to block 8 adjacent pixels with two extending to each of the three dimension, hence forming a node of 2×2×2 pixels. This grouping is particularly useful at the coding stage, since one can utilize correlation among pixels in the same node. With this basic unit, one still needs to set up trees that cover all the pixels in the 3-D spatio-temporal domain. To cover all the pixels using trees, two constraints except at a node (root node) of the highest level of the pyramid must be imposed as follows.

1. Each pixel has 8 offspring pixels.

2. Each pixel has only one parent pixel.

With the above constraints, there exists only one reasonable parent-offspring linkage in the 3-D SPIHT. Given video dimensions of M×N×F, where M, N, and F are horizontal, vertical, and temporal dimensions of the coding unit or GOP, and further supposing that l recursive decompositions in both spatial and temporal domains exist, root video dimensions of $M_R \times N_R \times F_R$, where $M_R = M|2^l$, $N_R = N|2^l$, and $F_R = F|2^l$, can be determined. Then, three different sets are defined as follows.

Definition: A node represented by a pixel (i,j,k) is said to be a root node, a middle node, or a leaf node according to the following rule.

If $i < M_R$ and $j < N_R$ and $k < F_R$ then (i,j,k) ∈ R

Else if $i \geq M/2$ and $j \geq N/2$ and $k \geq F/2$, then (i,j,k) ∈ L

Else (i,j,k) ∈ M, where the sets R, M, and L represent Root, Middle, and Leaf sets, respectively.

Figure 13:
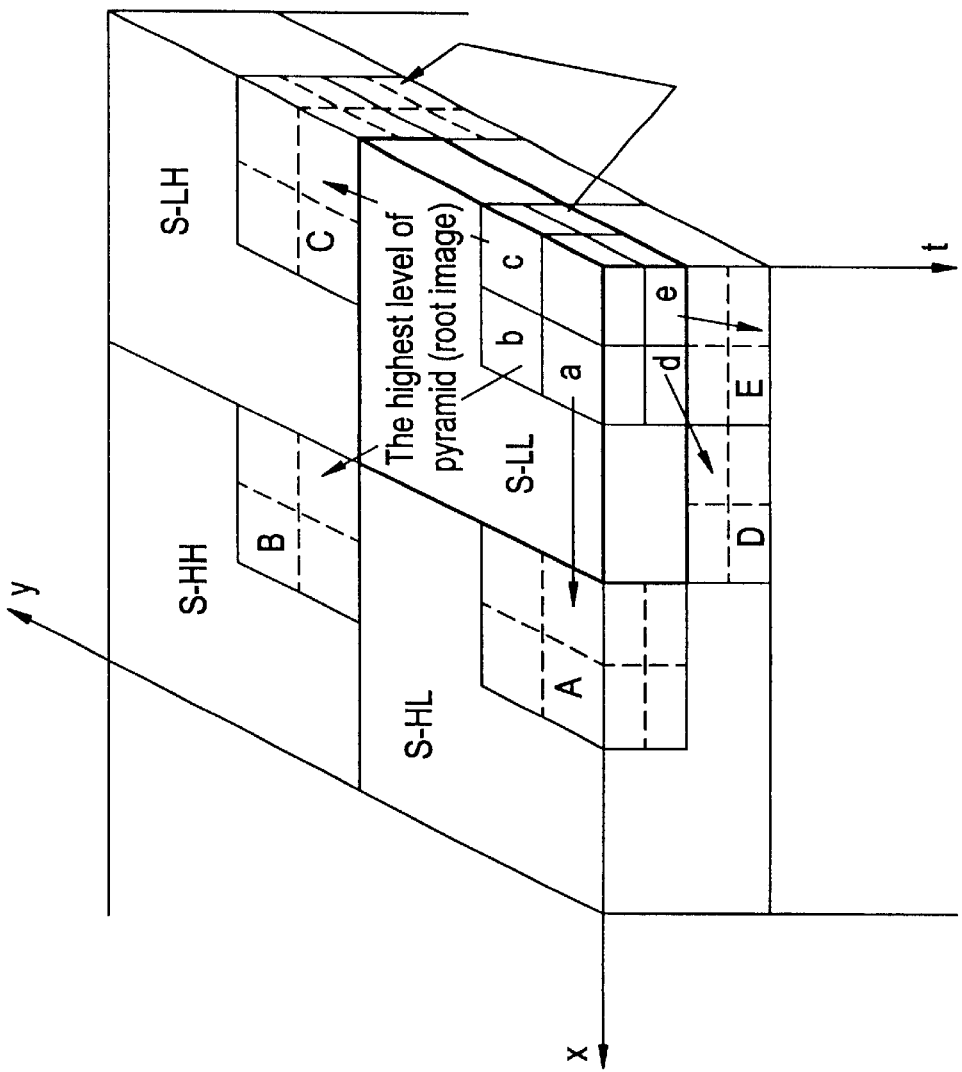
FIG. 13 is a schematic illustration of parent-child relationships within the image bitmap of a 3-D GOP pursuant to the present invention.

Given the above three different classes of a node, there exist three different parent-offspring rules. Given O(i,j,k) as a set of offspring pixels of a parent pixel (i,j,k), the following three different parent-offspring relationships exist, depending on a pixel location in the hierarchical tree:

One exception as in 2-D SPIHT is that one pixel in a root node has no offspring. FIG. 13 depicts the parent-offspring relationships in the highest level of the pyramid, assuming the root dimension is 4×4×2 for simplicity. It will be appreciated that S-LL, S-LH, S-HL, and S-HH represent spatial low-low, low-high, high-low, high-high frequency subbands in the vertical and horizontal directions. There is a group (node) of 8 pixels indicated by '*', 'a', 'b', 'c', 'd', 'e', 'f' in S-LL, where pixel 'f' is hidden under pixel 'b'. Every pixel located at '*' position in a root node has no offspring. Each arrow originating from a root pixel pointing to a 2×2×2 node shows the parent-offspring linkage. In FIG. 13, offspring node 'F' of pixel 'f' is hidden under node 'B' which is offspring node of 'b'. Having defined a tree, the same sorting algorithm discussed above can be now applied to the video sequence along the new spatio-temporal trees, i.e., set partitioning is now performed in the 3-D domain.

Comparing FIG. 3 with FIG. 13, one can see that the trees grow to the order of 8 branches, while 2-D SPIHT has trees of order of 4. Hence, the bulk of compression can potentially be obtained by a single bit which represents insignificance of a certain spatio-temporal tree.

The tree structure described immediately above required offspring in a 2×2×2 pixel cube for every parent having offspring. Hence, there must be the same number of decomposition levels in all three dimensions. Therefore, as three spatial decompositions seem to be the minimum for efficient image coding, the same number temporal decompositions forces the GOP size to be a minimum of 16, because the SPIHT methodology needs an even number in each dimension in the coarsest scale at the top of the pyramid.

To achieve more flexibility in choosing the number of frames in a GOP, the uniformity in the number of spatial and temporal decompositions need not be maintained, allowing for unbalanced trees. For example, suppose that there are three levels of spatial decomposition and one level of temporal decomposition with 4 frames in the GOP. Then a pixel with coordinate (i,j,0) has a longer descendant tree (3 levels) than that of a pixel with coordinate (i,j,1) (1 level), since any pixel with temporal coordinate of zero has no descendants in the temporal direction. Thus, the descendant trees in the significance tests in the latter case terminate sooner than those in the former case. This modification in structure can be noted in this case by keeping track of two different kinds of pixels. One pixel has a tree of three levels and the other a tree of one level. The same kind of modification can be made in the case of a GOP size of 8, where there are two levels of temporal decomposition.

It should be mentioned that with a smaller GOP and removal of structural constraints, there are more possibilities in the choice of filter implementations and the capability of a larger number of decompositions in the spatial domain to compensate for a possible loss of coding performance from reducing the number of frames in the GOP. For example, it would be better to use a shorter filter with short segments of four or eight frames of the video sequence, such as the Haar or S+P filters, which use only integer operations, with the latter being the more efficient. It should also be mentioned that Haar and S+P filters are well known filter constructions and, thus, will not be described in greater detail. Finally, it should be mentioned that still other possibilities exist for linking temporal or axial coefficients to spatial ones in a tree structure. What distinguished this kind of three-dimensional coding from a two-dimensional one is that the coding operates on coefficients residing on trees that link coefficients in all three dimensions.

Having described the 3-D wavelet-transformation of a video sequence to set up 3-D spatio-temporal trees, the next step is to describe compression of the coefficients into a bit-stream. Essentially, compression can be accomplished by feeding the 3-D data structure to the 3-D SPIHT kernel 306. Then, the 3-D SPIHT kernel 306 sorts the data according to magnitude of the data along the spatio-temporal orientation trees (sorting pass), and refines the bit plane by adding necessary bits (refinement pass). From the discussion above with respect to 2-D SPIHT decoding, the decoder 330 will follow the same sequence to recover the data and, thus, regenerate the GOP.

Up until this point, only one color plane, namely luminance, has been considered. What is needed is a simple application of the 3-D SPIHT methodology to any color video coding, while still retaining full embeddedness, and precise rate control.

The simplest adaptation of the SPIHT methodology to color video would be to code each color plane separately as does a conventional color video coder. Then, the generated bit-stream of each plane would be serially concatenated. However, this simple method would require allocation of bits among color components, thus sacrificing precise rate control. Moreover, it would fail to meet the requirement of full embeddedness of the video codec, since the decoder needs to wait until the full bit-stream arrives in order to reconstruct and display the GOP in color. Instead, one can treat all color planes as one unit at the coding stage, and generate one mixedbit-stream so that reconstruction the color video can be stopped at any point in the bit-stream, allowing reconstruction at the best quality for the given bit-rate. In addition, the algorithm advantageously can be made to automatically allocate bits optimally among the color planes. By doing so, the full embeddedness and precise rate control of 3-D SPIHT methodology can be maintained. It will be noted that this methodology applies equally to 2-D SPIHT encoding/decoding.

Figure 14A:
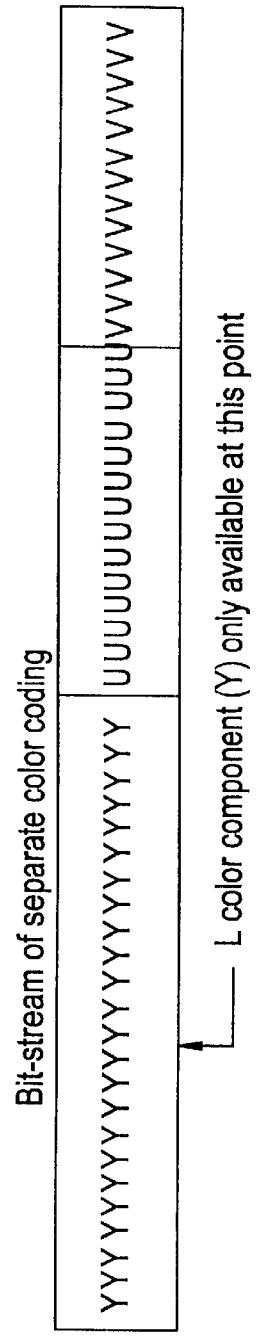
FIGS. 14a and 14b illustrate separate color coding and embedded color coding, respectively, of a color video bit stream.
Figure 14B:
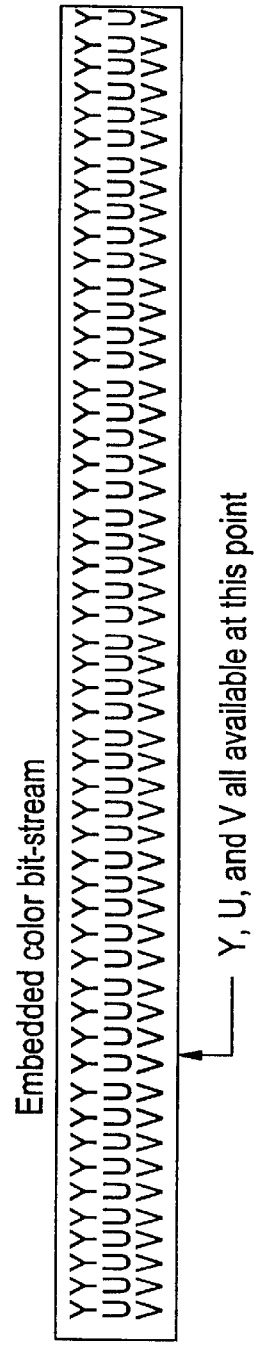

The bit-streams generated by both of the above-described methods are depicted in the FIGS. 14a and 14b, where FIG. 14a shows a conventional color bit-stream, while FIG. 14b shows how the color embedded bit-stream is generated. From FIG. 14b, it will be appreciated that data transmission can be stopped at any point of the bit-stream while still permitting reconstruction of the GOP at the cut-off bit-rate, which is clearly not the case with respect to FIG. 14a.

Figure 15:
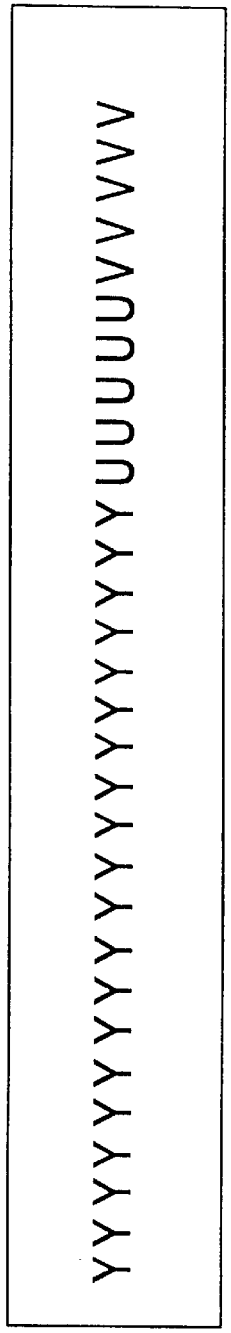
FIG. 15 illustrates the initial internal structure of LIP and LIS sets, assuming that the U and V planes are one-fourth the size of the Y plane in a color video.

Consider a tri-stimulus color space with luminance Y plane such as YUV, YCrCb, etc., which are simple examples of color spaces well known to one of ordinary skill in the art. Each such color plane will be separately wavelet transformed, having its own pyramid structure. Now, to code all color planes together, the 3-D SPIHT algorithm in the 3-D SPIHT kernel 306 will initialize the LIP and LIS with the appropriate coordinates of the top level in all three planes. FIG. 15 illustrates the initial internal structure of the LIP and LIS, where Y, U, and V stand for the coordinates of each root pixel in each color plane. Since each color plane has its own spatial orientation trees, which are mutually exclusive and exhaustive among the color planes, it automatically assigns the bits among the planes according to the significance of the magnitudes of their own coordinates. The effect of the order in which the root pixels of each color plane are initialized will be negligible, except when coding at extremely low bit-rate.

Although the image sequence coder 300 naturally produces scalability in rate, it is also highly desirable to have temporal and/or spatial scalabilities for today's many multimedia applications such as video database browsing and multicast network distributions. Multiresolution decoding allows the user to decode video sequences at different rates and/or different spatial/temporal resolutions from one bitstream. Furthermore, a layered bit-stream advantageously can be generated with multiresolution encoding, from which the higher resolution layer can be used to increase the spatial/temporal resolution of the video sequence obtained from the low resolution layer. In other words, full scalability in rate and partial scalability in space and time advantageously can be achieved with multiresolution encoding and decoding.

Since the 3-D SPIHT image sequence coder 300 is based on the multiresolution wavelet decomposition, it is relatively easy to add multiresolutional encoding and decoding as functionalities in partial spatial/temporal scalability. The simpler case of multiresolutional decoding, in which an encoded bit-stream is assumed to be available at the decoder, will first be discussed immediately below. This multiresolutional decoding approach is quite attractive since it does not require corresponding changes to the encoder 300 structure. The idea behind multiresolutional decoding is very simple—the embedded bit-stream is partitioned into portions according to their corresponding spatio-temporal frequency locations, and only those portions that contribute to the desired resolution are decoded by decoder 330.

It should be mentioned here that after discussing multiresolutional decoding methodology in greater detail, multiresolutional encoding, i.e., the process or method of generating a layered bit-stream using a modified encoder, will then be described. It should also be mentioned that, depending on bandwidth availability, different combinations of the layers can be transmitted to the decoder 330 to thereby reconstruct video sequences with different spatial/temporal resolutions. Since the 3-D SPIHT image sequence coder 300 is symmetric, both the decoder 330 and the encoder 300 know exactly which information bits contribute to respective temporal/spatial locations. This makes multiresolutional encoding possible, since it becomes advantageously possible to order the original bit-stream into layers, with each layer corresponding to a different resolution (or portion). It should be noted that although the layered bit-stream is not fully embedded, the first layer is still rate scalable.

From the discussion above, it will be appreciated that the 3-D SPIHT algorithm uses significance map coding and spatial orientation trees to efficiently predict the insignificance of descendant pixels with respect to a current threshold. Moreover, the 3-D SPIHT algorithm refines each wavelet coefficient successively by adding residual bits in the refinement stage. The algorithm stops when the size of the encoded bit-stream reaches the exact target bit-rate. It will be appreciated that the final bit-stream transmitted via channel 320 consists of significance test bits, sign bits, and refinement bits.

Figure 16:
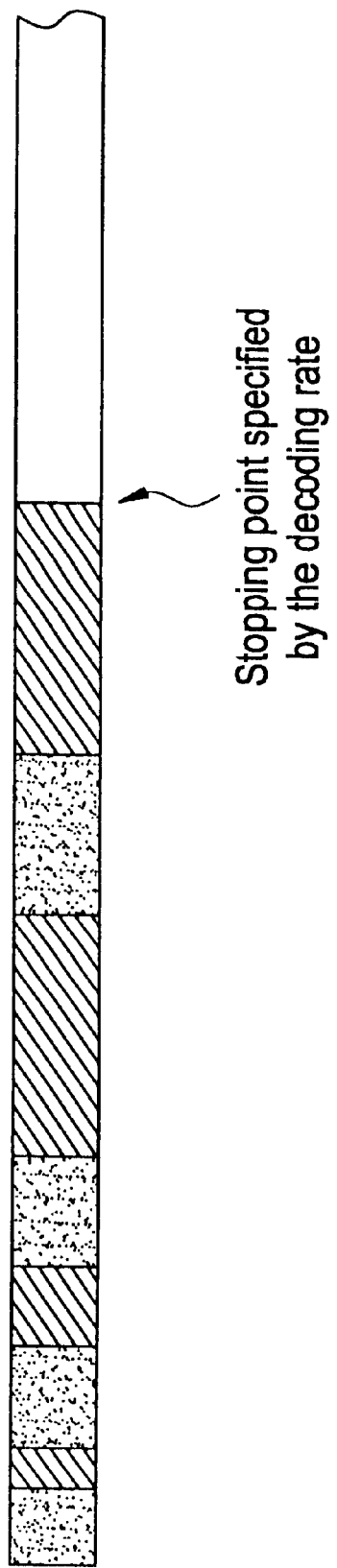
FIG. 16 is useful in understanding the process of partitioning the SPIHT encoded bit-stream into portions according to their corresponding temporal/spatial locations.

In order to achieve multiresolution decoding, the received bit-stream preferably is partitioned into portions according to their corresponding temporal/spatial location. This operation can be performed by putting two flags (one spatial and one temporal) in the bit-stream during the process of decoding, e.g., by scanning the bit-stream and marking that portion which corresponds to the temporal/spatial locations defined by the input resolution parameters. As the received bit-stream from the decoder is embedded, this partitioning process can terminate at any point of the bit-stream that is specified by the decoding bit-rate. FIG. 16 illustrates an exemplary bit-stream partitioning. The dark-gray portion of the bit-stream contributes to low-resolution video sequence, while the light-gray portion corresponds to coefficients in the high resolution. To reconstruct a low-resolution GOP sequence, one only needs to decode the dark-gray portion of the bit-stream and scale down the 3-D wavelet coefficients appropriately before performing the inverse 3-D wavelet transformation. The dark-gray portion of the bit-stream in FIG. 16 advantageously can be further partitioned for decoding in even lower resolutions in the multimedia data stream.

By varying the temporal and spatial flags in decoding, different combinations of spatial/temporal resolutions can be obtained from the encoder 300. For example, if the user encodes a QCIF sequence at 24 frames per second (f/s) using a 3-level spatial-temporal decomposition, the user obtains at the decoder 330 three possible spatial resolutions (176×144, 88×72, 44×36), three possible temporal resolutions (24, 12, 6), and any bit rate that is upper-bounded by the encoding bit-rate. Any combination of the three sets of parameters is an admissible decoding format for the compressed bit-stream.

It will be appreciated that the advantages of scalable video decoding are savings in memory and decoding time. In addition, as illustrated in FIG. 16, information bits corresponding to a specific spatial/temporal resolution are not distributed uniformly over the compressed bit-stream in general. Most of the lower resolution information is crowded at the beginning part of the bit-stream and, after a certain point, most of the bit rate is spent in coding the highest frequency bands, which bands contain the detail of video which are not usually visible at reduced spatial/temporal resolution. What this means is that the user advantageously can establish a very small bit-rate for even faster decoding and browsing applications, saving decoding time and channel bandwidth with negligible degradation in the decoded video sequence.

Figure 17:
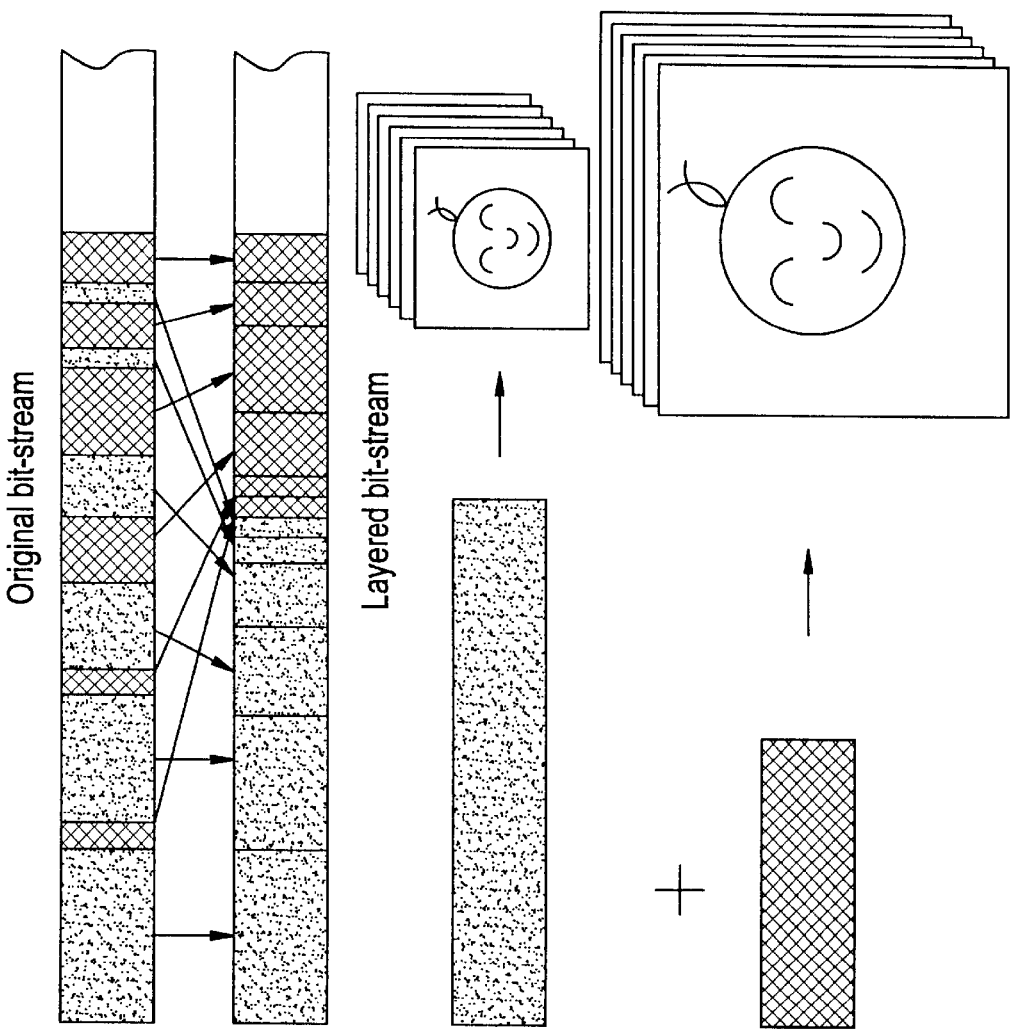
FIG. 17 illustrates a layered bit-stream generated by multiresolutional encoder according to the present invention, from which bit-stream the higher resolution layers can be used to increase the spatial resolution of the frame obtained from the low resolution layer.

The aim of multiresolutional encoding is to generate a layered bit-stream. However, information bits corresponding to different resolutions in the original bit-stream are interleaved. Fortunately, the SPIHT algorithm allows tracking of the temporal/spatial resolutions associated with these information bits. Thus, it will be appreciated that the encoder 300 advantageously can be modified so that the new encoded bit-stream is layered in temporal/spatial resolutions. Specifically, multiresolutional encoding amounts to putting into the first (low resolution) layer all the bits needed to decode a low resolution video sequence, in the second (higher resolution) layer those to be added to the first layer for decoding a higher resolution video sequence, and so on. This process is illustrated in FIG. 17 for the two-layer case, where scattered segments of the dark-gray (and light-gray) portion in the original bit-stream are put together in the first (and second) layer of the new bit-stream. A low resolution video sequence can be decoded from the first layer (dark-gray portion) alone, while a full resolution video sequence from both the first and the second layers.

As the layered bit-stream is a reordered version of the original one, overall scalability in rate cannot be maintained after multiresolutional encoding. However, the first layer (i.e., the dark gray layer in FIG. 17) is still embedded, and it can be used for progressive by fidelity decoding.

Unlike multiresolutional decoding in which the full resolution encoded bit-stream has to be transmitted and stored in the decoder, multiresolutional encoding has the advantage of wasting no bits in transmission and decoding at lower resolution. The disadvantages are that it requires that both the encoder and the decoder agree on the resolution parameters with the loss of embeddedness at higher resolution, as mentioned previously.

Figure 18C:
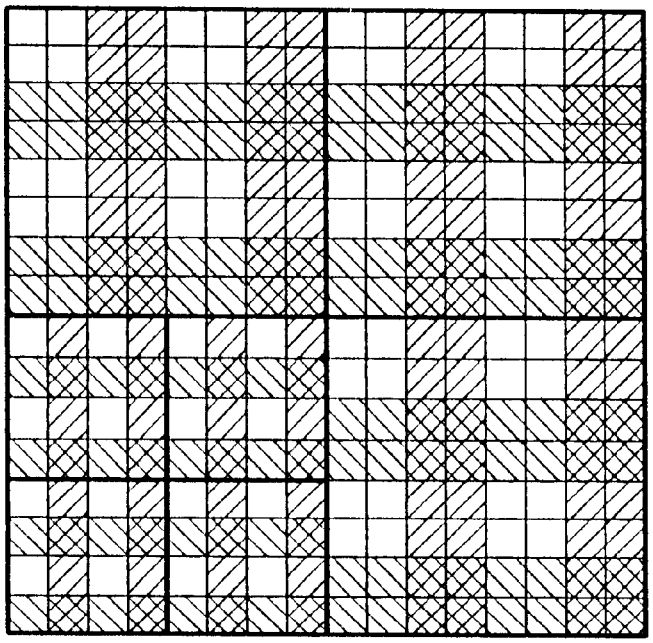
FIG. 18a illustrates the general spatio-temporal relation exploited by the 3-D SPIHT compression algorithm according to the present invention while FIGS. 18b and 18c contrast the STTP-SPIHT and ERC-SPIHT algorithms according to specifpreferred embodiments of the present invention.
Figure 18B:
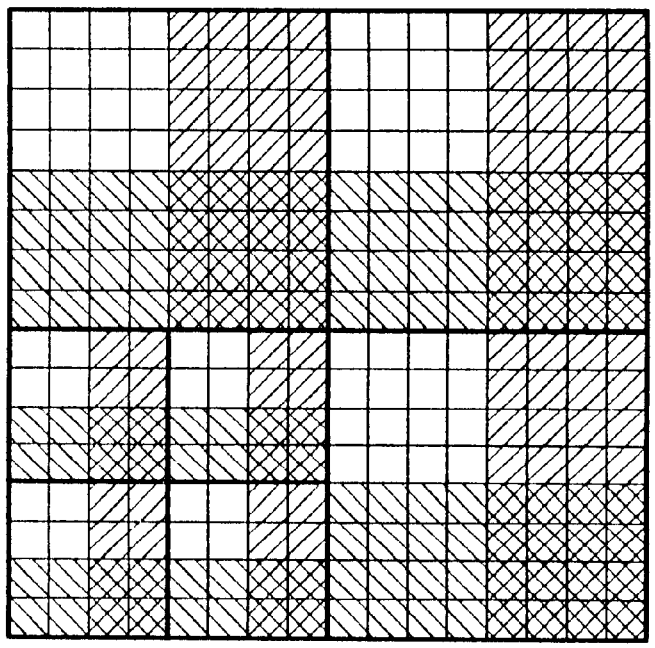

In order to achieve robust video over noisy channels, the 3-D SPIHT algorithm can be modified to protect the video data from channel bit errors by adapting the 3-D SPIHT algorithm to work independently in a number of so-called spatio-temporal (s-t) blocks. These s-t tree blocks are formed by grouping fixed numbers of contiguous tree roots (coefficients in the lowest frequency subband), as illustrated in FIG. 18b for the two-dimensional case. The separately encoded s-t blocks are divided into fixed-length packets and interleaved to deliver a fidelity embedded output bit stream. This algorithm is called STTP-SPIHT (Spatio-Temporal Tree Preserving 3-D SPIHT).

It will be appreciated that one effect of the STTP-SPIHT algorithm is that any bit error in the bitstream belonging to any one block does not affect any other block, so that higher error resilience against channel bit errors is achieved. Therefore any early decoding failure affects the full extent of the GOP in the normal 3-D SPIHT but, in the STTP-SPIHT, the failure allows reconstruction of the associated region with lower resolution only. This algorithm provides excellent results in most cases, but may still experience very early decoding errors, resulting in lower resolution video in specific regions.

One preferred embodiment according to the present invention employs a novel method for partitioning the wavelet coefficients into s-t blocks to solve the above-identified problems. Instead of grouping adjacent coefficients, the coefficients are grouped at a fixed interval in the lowest subband, depending on the number of s-t blocks S, as illustrated in FIG. 18b for the two-dimensional case. Thereafter, the spatio-temporal related trees of the coefficients are tracked and merged together. As a result, while the s-t blocks of the STTP-SPIHT correspond to certain local regions, the s-t blocks of the novel grouping method correspond to the full group of frames with lower resolution. This grouping method supports error concealment of lost coefficients using surrounding coefficients in the event of decoding failure. This algorithm will be referred to as the Error Resilient and Error Concealment 3-D SPIHT (ERC-SPIHT) algorithm in the discussion which follows.

It will be appreciated that, as with STTP-SPIHT, the sub-bitstreams are separated into fixed length packets, interleaved to obtain an embedded composite bitstream, and then encoded with a rate-compatible, punctured convolutional (RCPC) error-correction code with cyclic redundancy check (CRC). This kind of channel coding not only corrects errors, but also allows detection of decoding failures, so that decoding can cease in substreams where decoding failures occur. Because the sub-bitsreams are embedded, the correctly received bits in each sub-bitstream can be decoded to provide a reconstruction at lower resolution or accuracy.

It will also be appreciated that the 3-D SPIHT encoded video bitstreams advantageously can be implemented with unequal error protection by subdividing the embedded bitstreams, producing a hybrid coder, which combines the ERC-SPIHT algorithm and unequal error protection. This additional novel method can protect against early decoding error with high probability, because the method protects the beginning portion of the bitstream more strongly.

The SPIHT coding algorithm according to the present invention can best be understood by considering the tree structure of the wavelet coefficients exploited by this algorithm. FIG. 18a illustrates how coefficients in a three-dimensional (3-D) transform are related according to their spatial and temporal domains. Character 'a' represents a root block of pixels (2×2×2), and characters 'b', 'c', 'd' denote its successive offspring progressing through the different spatial scales and numbers '1', '2', '3' label members of the same spatio-temporal tree linking successive generations of descendants. It will be noted that the 16 pictures or frames in a GOP adduces 16 different frames of wavelet coefficients. These frames possess both spatial similarity internally across the different scales and temporal similarity between frames. FIGS. 18b and 18c contrast the workings of the STTP-SPIHT and the ERC-SPIHT algorithms discussed above. More specifically, both FIGS. 18b and 18c illustrate a two level decomposition of a 16×16 image where S=4. It will be appreciated that the STTP-SPIHT algorithm result illustrated in FIG. 18b advantageously can be applied to region-based video coding while the ERC-SPIHT algorithm result illustrated in FIG. 18c exhibits both excellent error concealment and a high compression ratio.

The SPIHT algorithm initially searches the lowest spatio-temporal subband for so-called significant coefficients, whose magnitude is no less than a predetermined threshold. The algorithm then searches the trees rooted in the lowest spatiotemporal subband for significant coefficients, and, in so doing, finds sets of coefficients that are less than the threshold, i.e., insignificant sets, by a single binary decision that is sent to the bitstream. The tree node that is the root of an insignificant set is put onto a list of insignificant sets (LIS). Whenever single coefficients are found to be insignificant, a '0' is sent to the bitstream and the location of the coefficient enters another list called the list of insignificant points (LIP). When a coefficient significant for the threshold is found, that finding is sent to the bitstream via a '1' along with its sign bit and its location is put onto a list of significant coefficients (LSP). After the algorithm traverses the root subband testing all such trees in this way, the threshold is halved and the process is repeated first by testing for significance at the lowered threshold of all coefficients in the LIP and then for all sets in the LIS. Those coefficients on the LSP at the previous higher threshold are refined in magnitude by sending their lower order magnitude bits in the bit plane (binary expansion) corresponding to the current threshold. The process continues through successive halving of the threshold, until the bit budget is exhausted. It will be appreciated that the decoder mimics the encoder's execution path, since it receives the significance decision bits which describe it.

Thus, the SPIHT bitstream comprises three kinds of bits: significance decision bits for single points or sets (called significance map bits); sign bits; and refinement bits. If errors occur in reception of sign or refinement bits, only the associated coefficients are reconstructed with value inaccuracies. On the other hand, if a significance map bit is in error, then the decoding algorithm deviates from the encoder's execution path and reconstructs the rest of the bitstream completely in error.

Figure 19:
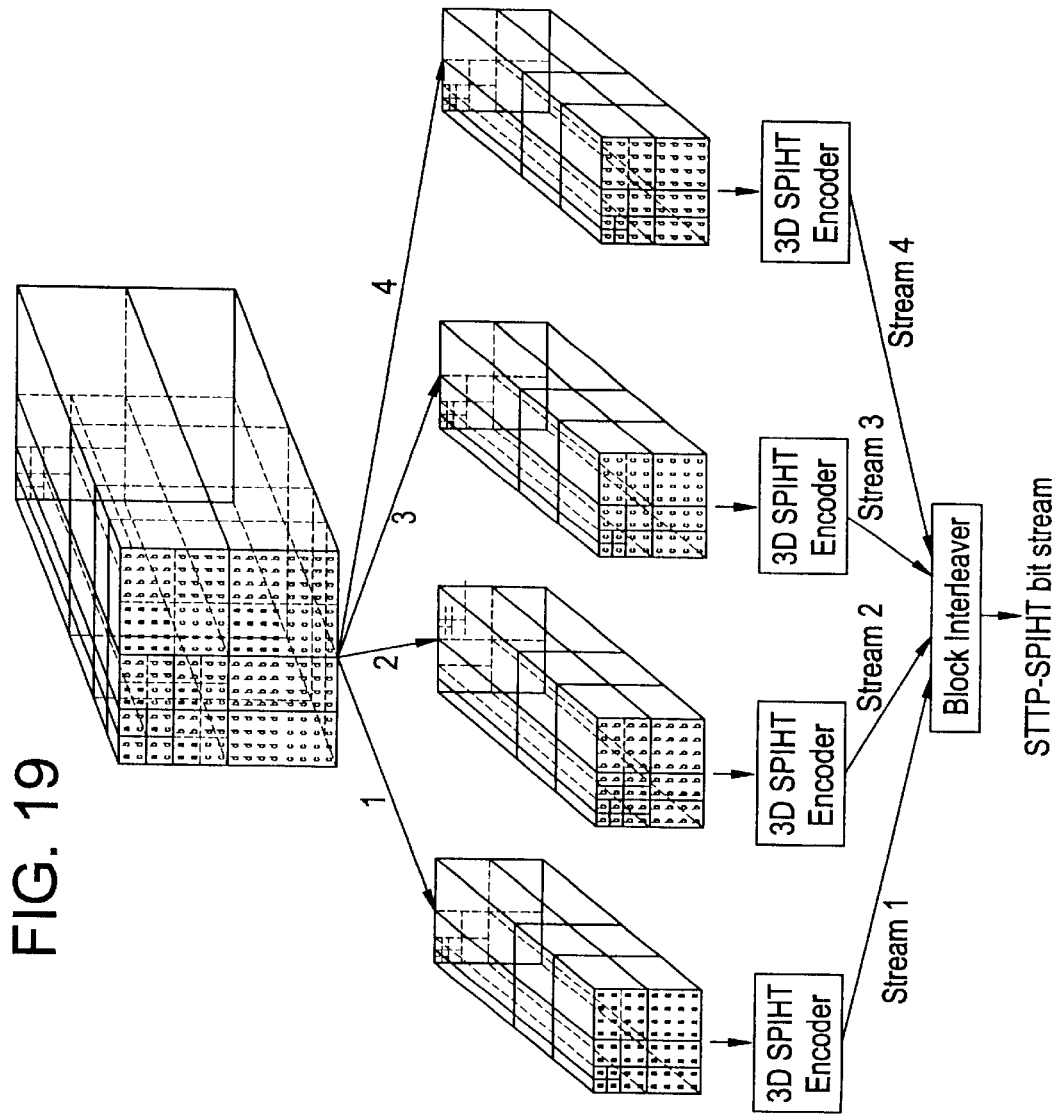
FIG. 19 illustrates the structure and operation of the Spatio-Temporal Tree Preserving 3-D SPIHT(STTP-SPIHT) compression algorithm.

FIG. 19 illustrates the structure and the basic idea of the STTP-SPIHT compression algorithm. The STTP-SPIHT algorithm divides the 3-D wavelet coefficients into some number S of different groups according to their spatial and temporal relationships, and then to encode each group independently using the 3-D SPIHT algorithm, so that S independent embedded 3-D SPIHT substreams are created. These bitstreams are then interleaved in blocks. Therefore, the final STTP-SPIHT bitstream will be embedded or progressive in fidelity, but to a coarser degree than the normal SPIHT bitstream. It will be appreciated that FIG. 19 illustrates an example of separating the 3-D wavelet transform coefficients into four independent groups, denoted by a, b, c, d, each one of which retains the spatio-temporal tree structure of normal 3-D SPIHT; these trees correspond to the specific regions of the image sequences. The s-t block, which is denoted by a, matches the top-left portion in all frames of the sequence transform. The other s-t blocks correspond to the top-right, bottom-left, bottom-right fractions of the image sequences, and those s-t blocks are denoted by b, c, d, respectively. The normal 3-D SPIHT algorithm is just a case of S=1, where S can be arbitrarily chosen, e.g., 1–330.

While STTP-SPIHT provides excellent results in both noisy and noiseless channel conditions while preserving all the desirable properties of the 3-D SPIHT, it is also susceptible to early decoding error, and this error results in one or more small regions with lower resolution than the surrounding area. Sometimes, this artifact occurs in an important region. To avoid this, early decoding error should be prevented so as to guarantee a minimum quality of the whole region.

A different method for partitioning the wavelet coefficients into s-t blocks according to the present invention advantageously can be employed to solve the problem. The 3-D SPIHT compression kernel is independently applied to each tree formed from the wavelet coefficients in the lowest subband and the spatially related coefficients in the higher frequency subbands. The algorithm produces sign, location and refinement information for the trees in each pass. Therefore, the spatio-temporal related trees need to be retained in order to maintain the compression efficiency of the 3-D SPIHT algorithm. However, the contiguous wavelet coefficients in the lowest subband need not be kept together, since the kernel is independently applied to each tree rooted in a single lowest subband coefficients and branching into the higher frequency subbands at the same s-t orientation. In the novel algorithm according to this preferred embodiment of the present invention, therefore, the lowest subband coefficients advantageously can be grouped at some fixed interval instead of grouping adjacent coefficients. This interval is determined by the number of s-t blocks S, the image dimensions, and the number of decomposition levels. Then, the spatio-temporal related trees of the coefficients are tracked and merged together.

It will be appreciated that the main advantage of the ERC-SPIHT is maintaining error resilience with coding efficiency. The same fixed rates are assigned to each substream. However, all of the sub-blocks contain similar information about each other, since each of the sub-blocks is composed of the coefficients not from a specific region, but from the whole region. Therefore, the fixed assignments of bitrates make more sense in the novel method according to the present invention. Another nice feature of the ERC-SPIHT is that the very early decoding failure affects the whole region because the decoded coefficients advantageously can be spread out to the whole area along with the sequence, and the coefficients missing or inaccurate from incompletely decoded bitstreams are concealed by estimation from other surrounding coefficients which are decoded at a higher rate. When the decoding failure occurs in the same position, the quality of ERC-SPIHT is much better than that of STTP-SPIHT in visually and numerically (PSNR) because ERC-SPIHT algorithm itself has an inherent characteristic of error concealment. Therefore, the ERC-SPIHT does not suffer from small areas that are decoded with a very low resolution.

Figure 20B:
FIG. 20a, 20b, 20c, and 20d illustrate the error-containing and error-corrected representative images of first and second video sequences.
Figure 20D:
Figure 20A:
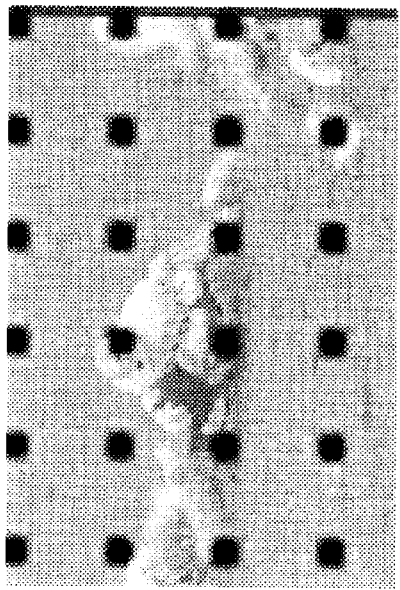
Figure 20C:
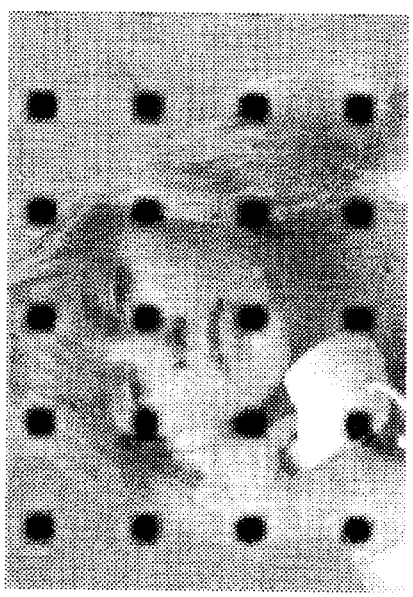

FIGS. 20a–20d illustrate the recovery capability of ERC-SPIHT in a worst-case example of decoding failure. For standard "Football" and "Susie" video sequences coded at 1.0 bit/pixel with ERC-SPIHT (S=16), decoding errors were introduced in the beginning of the substream number 2 (second packet) for the "Football" video sequence and the substream number 7 (seventh packet) for the "Susie" video sequence, so that one of the substreams is totally missing. As a result, all of the wavelet coefficients which correspond to the missing substreams are set to zeros. When the inverse wavelet transform is applied to the decoder, the corresponding regions are filled with black pixels, because the decoded pixel values are zeros. FIGS. 20a and 20c illustrate the results from the ERC-SPIHT without error concealment while FIGS. 20b and 20d illustrate the same images with error concealment. In this case, the average values of surrounding coefficients were employed for the missing coefficients only in the root subband. It will be appreciated that in the case without error concealment, there are many black spots in the images. However, when error concealment for the missing coefficients is employed, the missing areas of the representative images can be recovered very well.

It will be noted that the 3-D SPIHT compression kernel is implemented as 2 passes, a sorting pass and a refinement pass, which passes are repeatedly performed until the total bits produced meet the bit budget. During the sorting pass, sign bits and location bits are produced; during the refinement pass, refinement bits are generated. The location bits are results of significance tests on sets of pixels, including singleton sets, and correspond to what is often called the significance map.

The bits advantageously can be classified into one of two classes according to their bit error sensitivities. The sign bits and refinement bits can be classified as sign and refinement bits (SRB), and the location bits can be classified by themselves (LOB). If any bit error occurs in LOB, then the compressed bit stream is useless downstream of the point where the bit error occurs. However, any bits in the SRB which are affected by channel bit errors do not propagate as long as the LOBs are error free. It should be mentioned that the LOB bits contain the information of location of the wavelet coefficients and should be synchronized between encoder and decoder. Based on experimental results, the size of the SRB ranges from 20% to 25% of the original bitstream, depending on the rate.

Figure 21:
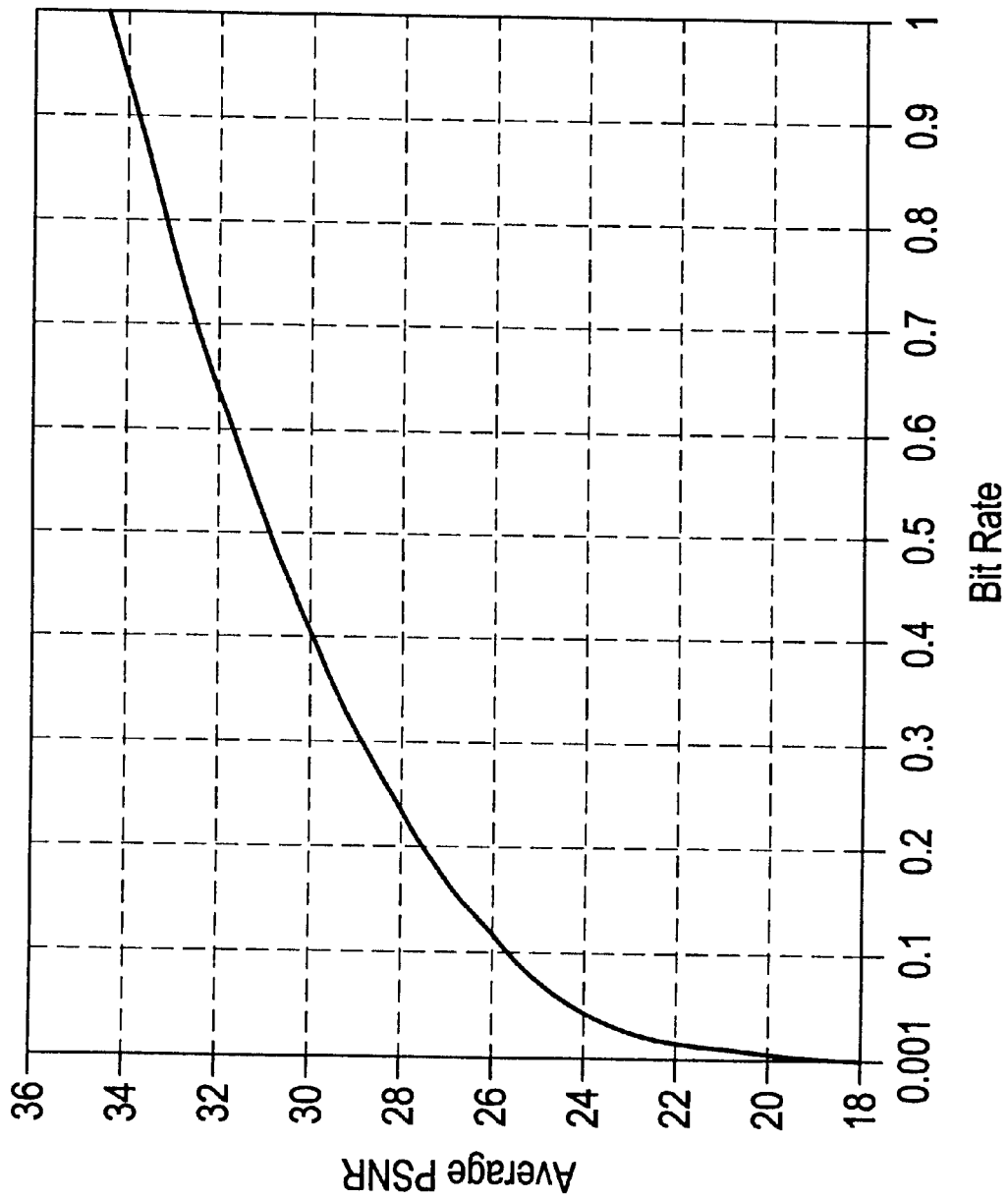
FIG. 21 is a plot of bit rate vs. average peak signal-to-noise ratio (PSNR) illustrating one feature of the Error Resilient and Error Concealment 3-D SPIHT (ERC-SPIHT) algorithm according to an exemplary embodiment of the present invention.

In addition, the 3-D SPIHT algorithm has an important property that all the compressed bits are positioned in the order of their contribution to value. This means that SPIHT produces a purely embedded or progressive bitstream, meaning that the later bits in the bitstream refine earlier bits, and the earlier bits are needed for the later bits to be useful. FIG. 21 plots average peak signal-to-noise ratio (PSNR) values versus bitrates for the "Football" video sequence. Examination of FIG. 21 reveals that the average PSNR value increases very rapidly when bitrates are lower than 0.05 bpp, i.e., most of the bits in this bitrate are LOBs. Above this rate, PSNR increases much more gradually with bitrate. This result implies that the very beginning of the bitstream should be more strongly protected against channel bit errors than later portions of the bitstream.

For this reason, even if only the beginning part of the bitstream is available, a rough rendition of the source image can still be produced. However, if just a small portion at the beginning part of the bitstream containing LOB bits is lost, nothing can be reconstructed from the bitstream. From this insight, the LOB class can be further subpartitioned into two classes, i.e., LOB-a and LOB-b. Each class corresponds to the earlier and later parts, respectively, of the bitstream.

The analysis presented above can be employed to achieve higher error resilience with respect to channel bit errors. The novel method entails separating the SRB and LOB in the original bitstream, and then transmitting first the SRB with lowest error protection (highest channel code rate), and then LOB-a and LOB-b, each with stronger protection (lower channel code rate) than SRB, but with LOB-a receiving a lower coder rate (higher protection) than LOB-b. The reason for transmitting SRB bits first is that the decoder needs sign bits once LOB bits indicating significance are encountered. FIGS. 22a and 22b graphically illustrate this methodology. FIG. 22a illustrates the structure of the unequal error protection 3-D SPIHT (UEP-SPIHT) and specifically how the bits are classified and combined together. It will be appreciated that an arithmetic coding is not employed for SRB bits to avoid error propagation among the bits. FIG. 22b presents the bitrate assignments according to their bit error sensitivities and importance, i.e., LOB-a should be, and is, highly protected, because these bits are more important than others in terms of bit sensitivities and the order of importance. LOB-b and SRB can be protected with successively higher channel coding rates.

As depicted in the FIG. 22b, the SRB bits are transmitted first, followed by the LOB bits. This means that while sending SRB bits, this bitstream is not progressive. However, after sending SRB bits, this bitstream is purely progressive, since all the SRB bits are stored in a buffer, and the sign bits in this buffer are accessed when LOB significance bits are encountered. As mentioned above, the SRB segment ranges from 20% to 25% of the total bitstream for source code rates about 1 bpp (2.53 Mbps). The SRB size is relatively smaller at smaller bitrates. Therefore it is possible to obtain higher error resilience against channel bit errors while sacrificing the progressiveness to a small extent. In the UEP-SPIHT header, just one negligible additional item of information is required, i.e., the SRB size.

From the discussion thus far, it will be appreciated that the ERC-SPIHT method according to a preferred embodiment of the present invention provides excellent results in both noisy and noiseless channel conditions while preserving all the desirable properties of the 3-D SPIHT. However, this method still stops the decoding process for the substream wherein the first decoding error occurs. When such a decoding error occurs, the following bits must be discarded, but the fact that the bits have been discarded can effectively be conceal for the affected region. Furthermore, the higher protection of the early part of the bitstream in the unequal error protection scheme makes the potentially disastrous early decoding error much less likely to occur. To implement unequal error protection in the novel ERC-SPIHT methodology, the sub-bitstreams are partitioned according to their bit sensitivities and the order of importance.

FIG. 22c illustrates this concept. Every substream is divided into SRB and LOB segments, denoted by SRB1–SRBn, and LOB1–LOBN, where each is divided into its LOB-a and LOB-b segments. As was done in the 3-D SPIHT algorithm, all of the SRBs are transmitted first, and then the LOB bits are transmitted. In order to restore progressiveness to the composite bitstream, a packet interleaving/deinterleaving scheme advantageously can be employed for the LOB area to maintain progressiveness. The overhead of this method is the information bits which are saved in each sub-bitstream header to convey its SRB size. The determination of the number of packets for each class will be discussed below.

In order to decode the bitstream, the decoder reads the header first, and distributes the SRBs to buffer areas according to the information of the SRBs' size as the bits are arriving. Once all the SRBs have arrived, the decoder deinterleaves the LOBs according to the packet size, since the LOBs are sent as an interleaved bitstream, and decodes the bitstreams together with the SRBs. Thus, early portions of this bitstream are strongly protected with little loss of progressiveness.

Figure 23:
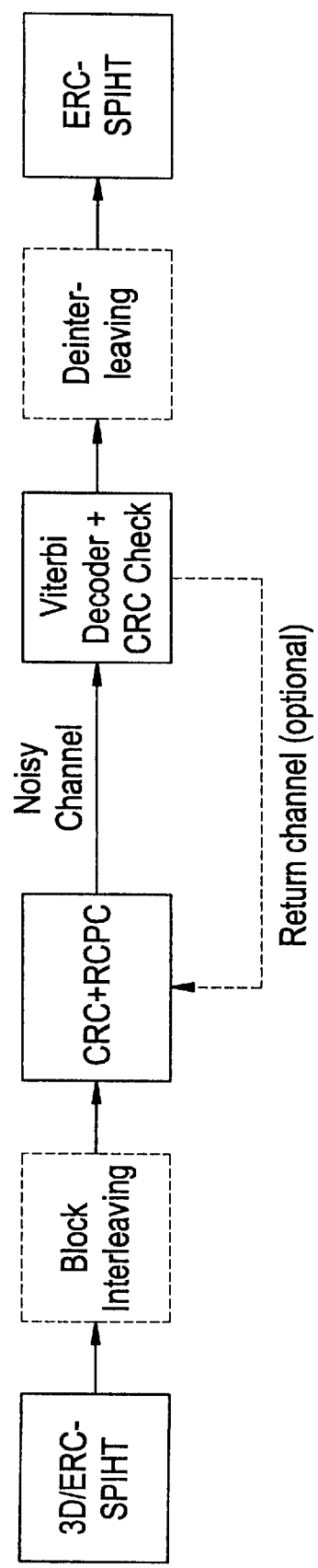
FIG. 23 is a high-level block diagram of a system implementing the 3-D/ERC-SPIHT with RCPC method according to an exemplary embodiment of the present invention.

FIG. 23 is a high level block diagram illustrating the system according to an exemplary embodiment according to the present invention, a system including a 3D/ERC-SPIHT with RCPC coder. It will be appreciated that the phantom functional blocks representing packet interleaving and deinterleaving functions are needed for implementing the ERC-SPIHT and STTP-SPIHT coding and decoding methods, but not for regular 3-D SPIHT. It will be noted that before RCPC encoding, the bitstream is partitioned into equal length segments of N bits. Each segment of N bits is then passed through a cyclic redundancy code (CRC) parity checker to generate c parity bits. In a CRC, binary sequences are associated with polynomials of a certain polynomial g(x) called the generator polynomial. Hence, the generator polynomial determines the error control properties of a CRC.

Next, m bits, where m is the memory size of the convolutional coder, are padded at the end of each N+c+m bits of the segment and passed through the rate r RCPC channel coder, which is a type of punctured convolutional coder with the added feature of rate compatibility. The effective source coding rate Reff for the original 3-D SPIHT is given by $$\text{Reff} = (Nr \times R\text{total})/(N+c+m),$$

where a unit of Reff and Rtotal can be either bits/pixel, bits/sec, or the length of bit-stream in bits. The total number of packets M is calculated by Reff/N, where Reff is the bitstream length. In the case of unequal error protection, the $\text{Reff}_{SRB}$ and MSRB are according to the set forth immediately above. Then $\text{Reff}_{LOB-a}$ and $\text{Reff}_{LOB-b}$ can be calculated by $$[(r_{LOB-a} \times R_{LOB-a}) + (r_{LOB-b} \times R_{LOB-b})]/[N+c+m] = M - MSRB,$$

where $R_{LOB-a} + R_{LOB-b} = R_{total} - R_{SRB}$.

Although the techniques of the present invention have been described herein with respect to image processing, other forms of data may be processed. Any data set that may be transformed through subband decomposition may subsequently have the transform coefficients coded for transmission and/or storage using the disclosed techniques. For example, both a digitized audio segment and an electrocardiogram signal may be decomposed into frequency subbands and encoded as described herein. Furthermore, the coding techniques of the present invention may be applied to various types of subband decompositions with their associated filter and to other linkages of pixel coefficients within these subbands.

The present invention has many advantages and features associated with it. The coding scheme of the present invention used to process a subband decomposition of a data set provides a high level of compression while maintaining a high computational efficiency. The transmitted code (i.e., compressed data set) is completely embedded, so that a single file for, e.g., an image at a given code rate can be truncated at various points and decoded to give a series of reconstructed images at lower rates. Processing may even be run to completion resulting in a near lossless (limited by the wavelet filters) compression. Further, the encoder and decoder use symmetrical techniques such that computational complexity is equivalent during both encoding and decoding. Thus, the techniques of the present invention advance the state of subband decomposition data compression techniques. The coding results are either comparable to, or surpass, previous results obtained through much more sophisticated and computationally complex methods.

The individual programming steps required to implement the techniques of the present invention will be apparent to one of ordinary skill in the art in view of the discussion presented herein.

According to the present invention, a complete video coding system advantageously can employ the SPIHT (set partitioning in hierarchical trees) coding algorithm for coding three dimensional (wavelet) subbands. The SPIHT algorithm advantageously can be employed in both still image coding and video coding, while retaining its attributes of complete embeddedness and scalability by fidelity and resolution. Three-dimensional spatio-temporal orientation trees coupled with SPIHT sorting and refinement produces a 3-D SPIHT image sequence coder that provides performance superior to that of MPEG-2 and comparable to that of H.263 with minimal system complexity. Extension to color-embedded image sequence coding is accomplished without explicit bit-allocation, and can be used for any color plane representation. In addition to being rate scalable, the disclosed image sequence coder allows multiresolution scalability in encoding and decoding in both time and space from one bit-stream. These attributes of scalability, which are lacking in MPEG-2 and H.263, along with many desirable features, such as full embeddedness for progressive transmission, precise rate control for constant bit-rate (CBR) traffic, and low-complexity for possible software-only video applications, makes the image sequence coder and corresponding decoder an attractive candidate for multi-media applications. Moreover, the codec is fast and efficient from low to high rates, obviating the need for a different standard for each rate range.

While the invention has been described in detail herein, in accordance with certain preferred embodiments thereof, many modifications and changes therein may be affected by those skilled in the art. Accordingly, it is intended by the following claims to cover all such modifications and changes as fall within the true spirit and scope of the invention.

What is claimed is:

1. A method for one of encoding and decoding a N-dimensional data set, comprising:
    (a) subband decomposing the N-dimensional data set to thereby generate a N-dimensional subband decomposition;
    (b) initializing a list of insignificant set of points (LIS), a list of significant points (LSP), and a list of individual insignificant points (LIP);
    (c) populating the LIS with sets, each of the sets being designated by a root node within the N-dimensional subband decomposition and having a corresponding tree structure of points within the N-dimensional subband decomposition, which tree structure of points is organized as descendants and offspring of the root node but not including the root node;
    (d) populating the LIP with points from within the highest designated subband of the N-dimensional subband decomposition;
    (e) evaluating the descendants of the root node of each of the sets for significance;
    (f) for each root node of a respective one of the sets having at least one significant descendant, evaluating descendants of the offspring of the root node for significance; and
    (g) if the root node has at least one significant descendant of offspring, then adding additional sets corresponding to each of the offspring of the root node to the LIS as a root node thereof; and
    (h) moving one of the points from the LIP to the LSP when a coefficient associated with a point is greater than or equal to the predetermined threshold;

wherein:
    N is a positive integer;
    the LSP initially comprises an empty set;
    a first generation of the descendants comprise the offspring;
    a significant descendent of the descendants of the root node has a coefficient greater than or equal to a predetermined threshold; and
    a significant descendant of the offspring of the root node has a coefficient greater than or equal to the predetermined threshold.

2. The method as recited in claim 1, wherein the method comprises an encoding method, which further comprises the steps of:
    outputting a sign representing a coefficient of the point;
    outputting a significance value for each point within the LIP, the significance value indicating whether a coefficient of the point within the LIP is greater than or equal to the predetermined threshold.

3. The method as recited in claim 1, wherein the method comprises a decoding method, which further comprises the steps of:
    receiving a sign representing a coefficient of the point;
    receiving a significance value for each point within the LIP, the significance value indicating whether a coefficient of the point within the LIP is greater than or equal to the predetermined threshold.

4. The method as recited in claim 1, wherein the method comprises an encoding method, which further comprises the steps of:
    for each root node of the LIS having at least one significant descendant, evaluating the offspring of the root node for significance; and
    immediately outputting a significance value for each offspring of the root node, the significance value indicating whether the offspring is significant.

5. The method as recited in claim 4, further comprising the steps of:
    for each significant offspring of the root node, adding the significant offspring to the LSP; and
    outputting a sign of the coefficient of the significant offspring.

6. The encoding method as recited in claim 5, wherein:
    an insignificant offspring of the root node has the coefficient less than the predetermined threshold, and
    the method further comprises the step of, for each insignificant offspring of the root node, adding the insignificant offspring to the LIP.

7. The encoding method as recited in claim 1, wherein N=1, and the 1-dimensional data set corresponds to audio data.

8. The encoding method as recited in claim 1, wherein N=1, and the 1-dimensional data set corresponds to biological data signals.

9. The encoding method as recited in claim 1, wherein N=2, and the 2-dimensional data set corresponds to still image data.

10. The encoding method as recited in claim 1, wherein N=3, and the 3-dimensional data set corresponds to an image sequence.

11. The encoding method as recited in claim 10, wherein the image sequence comprises volume imagery.

12. A data structure in a computer memory for use in encoding and decoding an N-dimensional subband decomposition of data points, the data structure comprising a list (LIS) consisting of insignificant sets of points, a list (LSP) consisting of significant points and a list (LIP) consisting of insignificant points, wherein:

N is a positive integer;

for each set of the LIS, the data structure includes a root node and a set type identifier, the set type identifier defining generations of descendants associated with the root node within the set of the LIS, wherein a first generation of descendants comprise offspring of the root node;

the LIP is populated with points from within the highest designated subband of the N-dimensional subband decomposition; and the LSP is initially empty.

13. The data structure as recited in claim 12, wherein N=1, and the 1-dimensional data set corresponds to speech.

14. The data structure as recited in claim 12, wherein N=1, and the 1-dimensional data set corresponds to a biological data signal.

15. The data structure as recited in claim 12, wherein N=2, and the 2-dimensional data set corresponds to still image data.

16. The data structure as recited in claim 12, wherein N=3, and the 3-dimensional data set corresponds to an image sequence.

17. The data structure as recited in claim 16, wherein the image sequence comprises video.

18. A data structure in a computer memory for use in encoding and decoding an N-dimensional subband decomposition of data points, said data structure, after initialization, comprising at least three lists including a list of insignificant sets of points (LIS), a list of significant points (LSP), and a list of insignificant points (LIP);

wherein:

N is a positive integer;

the LIS is populated with sets, each of the sets being designated by a root node within the N-dimensional subband decomposition and having a corresponding tree structure of points within the N-dimensional subband decomposition, which tree structure of points is organized as descendants and offspring of the root node but not including the root node;

the LIP is populated with points from within the highest designated subband of the N-dimensional subband decomposition; and the LSP is initially empty.

19. The data structure as recited in claim 18, wherein N=1, and the 1-dimensional data set corresponds to biological signal data.

20. The data structure as recited in claim 18, wherein N=2, and the 2-dimensional data set corresponds to still image data.

21. The data structure as recited in claim 18, wherein N=3, and the 3-dimensional data set corresponds to an image sequence.

22. A record medium storing a computer program including computer readable program code therein for converting a general purpose computer to one of an encoded and decoder apparatus for respectively encoding and decoding an N-dimensional data set, the computer program comprising:

first computer readable program code for permitting the general purpose computer to subband decompose the N-dimensional data set to thereby generate an N-dimensional subband decomposition;

second computer readable program code for causing the general purpose computer to create a list (LIS) consisting of insignificant sets of points, each set of the LIS being designated by a root node within the N-dimensional subband decomposition and having a corresponding tree structure of points within the N-dimensional subband decomposition, the corresponding tree structure being organized as descendants and offspring of the root node and not including the root node, wherein a first generation of the descendants comprise the offspring;

third computer readable program code for causing the general purpose computer to evaluate the descendants of the root node of each set of the LIS for significance, wherein a significant descendent of the descendants of the root node has a coefficient greater than or equal to the predetermined threshold;

fourth computer readable program code for causing the general purpose computer to affect for each root node of the LIS having at least one significant descendant, evaluating descendants of the offspring of the root node for significance, wherein a significant descendant of the offspring of the root node has a coefficient greater than or equal to the predetermined threshold; and fifth computer readable program code for causing the general purpose computer to affect adding additional sets corresponding to each of the offspring of the root node to the LIS as a root node thereof when the root node has at least one significant descendant of offspring, wherein N is a positive integer.

23. The record medium as recited in claim 22, wherein N=1, and the 1-dimensional data set corresponds to audio data.

24. The record medium as recited in claim 22, wherein N=2, and the 2-dimensional data set corresponds to still image data.

25. The record medium as recited in claim 22, wherein N=3, and the 3-dimensional data set corresponds to an image sequence.

26. Software for encoding an N-dimensional data set, the software instantiating functions that permit a general purpose computer to:

generate a subband decomposition for the N-dimensional data set to thereby generate an N-dimensional subband decomposition;

generate at least three lists including a list of insignificant sets of points (LIS), a list of significant points (LSP), and a list of insignificant points (LIP), where the LIS is populated with sets, each of the sets being designated by a root node within the N-dimensional subband decomposition and having a corresponding tree structure of points within the N-dimensional subband decomposition, which tree structure of points is organized as descendants and offspring of the root node but not including the root node, the LIP is populated with points from within the highest designated subband of the N-dimensional subband decomposition, and the LSP is initially empty, and output data corresponding to sorting of the LIS, the LSP, and the LIP in a predetermined sequence, wherein N is a positive integer.

27. The software as recited in claim 26, wherein N=1, and the 1-dimensional data set corresponds to biological data.

28. The software as recited in claim 26, wherein N=2, and the 2-dimensional data set corresponds to still image data.

29. The software as recited in claim 26, wherein N=3, and the 3-dimensional data set corresponds to an image sequence.

30. The software as recited in claim 26, wherein the output data permits complete embeddedness to thereby permit progressive fidelity transmission of the indicia corresponding to the N-dimensional subband decomposition.

31. The software as recited in claim 26, wherein the output data permits precise rate control to thereby permit constant bit-rate (CBR) traffic.

32. The software as recited in claim 26, wherein the output data permits multiresolution scalability.

33. The software as recited in claim 26, wherein the output data includes at least quantization level data, and both data corresponding to points in the N-dimensional subband decomposition determined to be significant and a respective sign of the coefficient of the points.

34. A method for one of encoding and decoding a 3-dimensional data set composed of multiple color planes, comprising:
  (a) subband decomposing the color planes to thereby generate a sequence of transformed color planes;
  (b) initializing a list of insignificant set of points (LIS), a list of significant points (LSP), and a list of individual insignificant points (LIP);
  (c) populating the LIS with sets, each of the sets being designated by a root node, corresponding to a coefficient in the lowest frequency subband of a selected one of the transformed color planes and having a corresponding tree structure of points within one of the same transformed color plane and branching to one or more coefficients in another one of the transformed color planes, which tree structure of points is organized as descendants and offspring of the root node but not including the root node;
  (d) populating the LIP with points from within the lowest frequency subbands of the sequence of transformed color planes;
  (e) evaluating the descendants of the root node of each of the sets for significance;
  (f) for each root node: of a respective one of the sets having at least one significant descendant evaluating descendants of the offspring of the root node for significance; and
  (g) if the root node has at least one significant descendant of offspring, then adding additional sets corresponding to each of the offspring of the root node to the LIS as a root node thereof; and
  (h) moving one of the points from the LIP to the LSP whenever a coefficient associated with a point is greater than or equal to the predetermined threshold;
  wherein:
    the 3-dimensional data set comprises a color embedded bit-stream generated from an integer number of the color planes;
    the LSP initially comprises an empty set;
    a first generation of the descendants comprise the offspring;
    a significant descendent of the descendants of the root node has a coefficient greater than or equal to a predetermined threshold; and
    a significant descendant of the offspring of the root node has a coefficient greater than or equal to the predetermined threshold.

35. Software for encoding a 3-dimensional data set including an integer number of color planes, the software instantiating functions that permit a general purpose computer to:
  generate a subband decomposition of the color planes from the 3-dimensional data set, wherein respective portions of the color planes are organized into an embedded color bit-stream, to thereby generate a 3-dimensional subband decomposition;
  generate at least three lists including a list of insignificant sets of points (LIS), a list of significant points (LSP), and a list of insignificant points (LIP), where the LIS is populated with sets, each of the sets being designated by a root node within the sequence of transformed color planes and having a corresponding tree structure of points within the sequence of transformed color planes, which tree structure of points is organized as descendants and offspring of the root node but not including the root node, the LIP is populated with points from within the highest-designated, lowest-frequency subbands of the sequence of the transformed color planes, and the LSP is initially empty; and
  output data corresponding to sorting of the LIS, the LSP, and the LIP in a predetermined sequence.

36. The software as recited in claim 35, wherein the output data permits complete embeddedness to thereby permit progressive fidelity transmission of the indicia corresponding to the 3-dimensional subband decomposition.

37. The software as recited in claim 35, wherein the output data permits multiresolution scalability.

38. An encoding process for compressing a video sequence including successive frames organized into a groups of frames (GOF), each frame being decomposed by a 3-dimensional wavelet transform producing a predetermined number of successive resolution levels, the encoding process transforming an original set of picture elements (pixels) corresponding to the GOF into wavelet transform coefficients encoded with a binary format and constituting a hierarchical pyramid, the coefficients being organized into a spatio-temporal orientation tree rooted in the lowest frequency resulting from the 3-dimensional wavelet transform and completed by an offspring in the higher frequency subbands, the process comprising:
  ordering the coefficients of the tree into partitioning sets involving the pixels and corresponding to respective levels of significance in accordance with magnitude testing permitting classification of the significance information in three ordered lists including a list of insignificant sets (LIS), a list of insignificant pixels (LIP) and a list of significant pixels (LSP), the tests being carried out in order to divide the original set of pixels into the partitioning sets according to a division process that continues until each significant coefficient is encoded within the binary representation, and the spatio-temporal orientation tree defining the spatio-temporal relationship inside the hierarchical pyramid; and
  outputting the binary representation corresponding to the ordered coefficients,
  wherein:
    the LIP is populated with points from within the highest designated subband of the N-dimensional subband decomposition; and
    the LSP is initially empty.

39. Software for encoding a 3-dimensional data set corresponding to an image sequence, the software instantiating functions that permit a general purpose computer to:
  generate a subband decomposition for the 3-dimensional data set to thereby generate an 3-dimensional subband decomposition;

divide the 3-dimensional subband decomposition into S subband decomposition groups based on at least one of their respective spatial and temporal relationships;

for each of the S subband decomposition groups,
generate at least three lists including a list of insignificant sets of points (LIS), a list of significant points (LSP), and a list of insignificant points (LIP), where the LIS is populated with sets, each of the sets being designated by a root node within the $S^{th}$ subband decomposition group and having a corresponding tree structure of points within the $S^{th}$ subband decomposition group, which tree structure of points is organized as descendants and offspring of the root node but not including the root node, the LIP is populated with points from within the highest designated subband of the $S^{th}$ subband decomposition group, and the LSP is initially empty, and then
output data corresponding to sorting of the LIS, the LSP, and the LIP in a predetermined sequence for the $S^{th}$ subband decomposition group; and output interleaved data based on the S predetermined sequences of the output data, wherein S is a positive integer.

* * * * *